(12) United States Patent
Hariton

(10) Patent No.: US 12,521,013 B2
(45) Date of Patent: Jan. 13, 2026

(54) SYSTEMS AND METHODS FOR RETINAL STIMULATION AND/OR COLLECTING RETINAL SIGNAL DATA

(71) Applicant: DIAMENTIS INC., Quebec (CA)

(72) Inventor: Claude Hariton, Saint Antoine de Tilly (CA)

(73) Assignee: DIAMENTIS INC., Quebec (CA)

( * ) Notice: Subject to any disclaimer, the term of this patent is extended or adjusted under 35 U.S.C. 154(b) by 468 days.

(21) Appl. No.: 18/166,795

(22) Filed: Feb. 9, 2023

(65) Prior Publication Data

US 2023/0248237 A1 Aug. 10, 2023

Related U.S. Application Data

(60) Provisional application No. 63/308,169, filed on Feb. 9, 2022.

(51) Int. Cl.
| | |
|---|---|
| A61B 3/12 | (2006.01) |
| A61B 3/00 | (2006.01) |
| A61B 3/11 | (2006.01) |
| A61B 3/14 | (2006.01) |
| A61B 3/15 | (2006.01) |
| A61B 5/398 | (2021.01) |

(52) U.S. Cl.
CPC .............. *A61B 3/12* (2013.01); *A61B 3/0008* (2013.01); *A61B 3/112* (2013.01); *A61B 3/14* (2013.01); *A61B 3/156* (2013.01); *A61B 5/398* (2021.01); *A61B 2560/0238* (2013.01)

(58) Field of Classification Search
CPC ......... A61B 3/12; A61B 3/0008; A61B 3/112; A61B 3/14; A61B 3/156; A61B 5/398; A61B 2560/0238; A61B 3/10; A61B 5/297

USPC .......................................................... 351/206
See application file for complete search history.

(56) References Cited

U.S. PATENT DOCUMENTS

| | | |
|---|---|---|
| 4,171,696 A | 10/1979 | John |
| 7,338,455 B2 | 3/2008 | White et al. |
| 7,670,764 B2 | 3/2010 | Oh et al. |
| 7,959,578 B2 | 6/2011 | Lonky |

(Continued)

FOREIGN PATENT DOCUMENTS

| | | |
|---|---|---|
| CA | 2905202 C | 12/2019 |
| CN | 110772268 A | 2/2020 |

(Continued)

OTHER PUBLICATIONS

Atchison, D. et al., Optics of the human eye, Elsevier Science Limited, 2000.

(Continued)

*Primary Examiner* — Mohammed A Hasan
(74) *Attorney, Agent, or Firm* — BCF LLP

(57) ABSTRACT

There is disclosed a method and system for retinal stimulation and retinal signal data collection. The system comprises a housing. The housing supports one or more light sources that are configured to expose a retina of an eye of an individual to a flash of light. The housing supports a spectrometer that is configured to record a light spectrum and an intensity of the flash of light. The housing supports a camera configured to capture image data of the eye while exposed to the flash of light.

20 Claims, 27 Drawing Sheets

(56) References Cited

U.S. PATENT DOCUMENTS

| | | | |
|---|---|---|---|
| 9,492,098 | B2 | 11/2016 | Davis et al. |
| 10,039,445 | B1 | 8/2018 | Torch |
| 2006/0122529 | A1 | 6/2006 | Tsau |
| 2007/0135727 | A1 | 6/2007 | Virtanen et al. |
| 2009/0227891 | A1 | 9/2009 | Peyman |
| 2009/0257023 | A1 | 10/2009 | Grenlee et al. |
| 2010/0204754 | A1* | 8/2010 | Gross ............... A61N 1/37217 607/53 |
| 2011/0245169 | A1 | 10/2011 | Brines et al. |
| 2011/0245734 | A1 | 10/2011 | Wagner et al. |
| 2011/0275927 | A1 | 11/2011 | Wagner et al. |
| 2011/0318346 | A1 | 12/2011 | Steinman |
| 2012/0033227 | A1* | 2/2012 | Bower ............... G01B 9/0203 356/479 |
| 2012/0053242 | A1 | 3/2012 | Cela Lopez |
| 2012/0059060 | A1 | 3/2012 | Blanda et al. |
| 2012/0092772 | A1 | 4/2012 | Salomon |
| 2012/0142589 | A1 | 6/2012 | Brines et al. |
| 2013/0308098 | A1* | 11/2013 | Levecq ............... A61B 3/1015 351/206 |
| 2015/0105689 | A1 | 4/2015 | Miller |
| 2015/0342495 | A1 | 12/2015 | Davis |
| 2016/0029919 | A1 | 2/2016 | Hebert et al. |
| 2016/0038025 | A1* | 2/2016 | Irsch .................. G02B 27/141 351/215 |
| 2016/0242672 | A1 | 8/2016 | Mikoshiba et al. |
| 2017/0348434 | A1 | 12/2017 | Leveillard |
| 2017/0354326 | A1* | 12/2017 | Pugh ..................... A61B 5/398 |
| 2019/0127684 | A1 | 5/2019 | Rizzolo |
| 2019/0175120 | A1 | 6/2019 | Huang |
| 2019/0209497 | A1 | 7/2019 | Ma |
| 2019/0282088 | A1* | 9/2019 | Mohanty ............... A61B 3/102 |
| 2020/0237214 | A1* | 7/2020 | Glik ......................... A61B 3/14 |
| 2021/0298687 | A1 | 9/2021 | Hariton |

FOREIGN PATENT DOCUMENTS

| | | |
|---|---|---|
| EP | 1977690 A1 | 10/2008 |
| EP | 2314201 A1 | 4/2011 |
| JP | 2018500906 A | 1/2018 |
| RU | 2141245 C1 | 11/1999 |
| WO | 2007061469 A1 | 5/2007 |
| WO | 2011133890 A1 | 10/2011 |
| WO | 2011119869 A1 | 11/2011 |
| WO | 2012021773 A1 | 2/2012 |
| WO | 2012051599 A1 | 4/2012 |
| WO | 2012116334 A3 | 8/2012 |
| WO | 2014197822 A2 | 12/2014 |
| WO | 2016007410 A1 | 1/2016 |
| WO | 2020118160 A1 | 6/2020 |
| WO | 2022087529 A1 | 4/2022 |

OTHER PUBLICATIONS

Cabrera Debuc,, D. et al., Retinal microvascular network alterations; potential biomarkers of cerebrovascular and neural diseases, Am J Physiol Heart Circ Physiol 321:H201-H212, 2017, First published Dec. 6, 2016, https://doi.org/10.1152/ajpheart.00201.2016.
Macgillivray, TJ., et al., Retinal imaging as a source of biomarkers for diagnosis charaterization and prognosis of chronic illness or long-term conditions, Br J Radiol 2014, 87:20130832, published online Jul. 15, 2014, https://doi.org/10.1259/bjr.20130832.
Lopez-Dorado, A. et al., Diagnosis of multiple sclerosis using multifocal ERG data feature fusion, Information Fusion 76, p. 157-167, May 25, 2021.
Chiquita, S. et al., The retina as a window or mirror of the brain changes detected in Alzheimer's disease: Critital aspects to unravel, Molecular Neurobiology, 56:5416-5435, 2019.
Asanad, S. et al., Retinal ganglion cell dysfonction in preclinical Alzheimer's disease: an electrophysiologic biomarker signature, Scientific Reports, 11:6344, 2021.
Constable, P. et al., Light-adapted electroretinogram differences in Autism Spectrum Disorder, Journal of Autism and Developmental Disorders, Feb. 7, 2020.
Demmin, D. et al., Electroretinographic anomalies in Schizophrenia, Journal of Abnormal Psychology, vol. 127, No. 4, pp. 417-428, 2018.
Peredo, R. et al., Electroretinography may reveal cognitive imparment among a cohort of subjects at risk of a major psychiatric disorder, Psychiatry Reseach 291, 113227, 2020.
Silverstein, S., et al., Measures of retinal structure and function as biomarkers in neurology and psychiatry, Biomarkers in Neuropsychiatry 2, 100018, 2020.
Diagnosys LLC, Electrodes for clinical practice, Feb. 10, 2021.
Harrison, W. et al., Multifocal electroretinograms predict onset of Diabetic Retinopathy in adult patients with diabetes, Invest. Ophthalmol Vis. Sci. 2011:52(2), 772-777.
Balogh et al., Retinal dysfunctions in schizophrenia, Progress in neuro-psychopharmacology & biological psychiatry, 32 (2008) 297-300.
Barraco et al., A comparison among different techniques for human ERG signals processing and classification, Physica Medica 2013.
Barraco et al., An approach based on wavelet analysis for feature extraction i the a-wave of the electroretinogram, Comput Met Prog Biomed, Elsevier Health, 2011.
Bubl et al., Seeing gray when feeling blue? Depression can be measured in the eye of the diseased, Biol Psychiatry, 2010.
Bubl et al., Effect of antidepressive therapy on retinal contrast processing in depressive disorder, This British Journal of Psychiatry 2012.
Castrogiovanni et al., Electroretinogram B-wave amplitude in panic disorder, 2001.
Electroretinograms, Gregor Belusic, free online editions of In Tech Books and Journals can be found at www. intechopen.com, 2011.
Fam et al., Visual contrast sensitivity in major depressive disorder, Journal of psychosomatic Research 2013.
Fomaro et al., Electroretinographic assessment in major depressed patients receiving duloxetine: Might differences between responders and non-responders indicate a differential biological background?, J Affect Disord 2011.
Forte et al., Wavelet analysis reveals dynamics of rat oscillatory potentials, J. Neurosci Met 2008.
Fountoulakis et al., Is there a dysfunction on the visual system of depressed patients?, Annals Gen Pscy, Mar. 2005.
Gagne et al., Atypical pattern of rod electroretinogram modulation by recent light history: A possible miomarker of seasonal affective disorder, 2011.
Gschwandtner et al., EEG: a helpful tool in the prediction of psychosis, Eur. Arch. Psychiatry Clin Neurosci., vol. 259, p. 257-262, Apr. 11, 2009.
Hebert et al., Retinal response to light in young nonaffected offspring at high genetic risk of neuropsychiatric brain disorders, Reseach Report, Biol Psychiatry 2010.
Hebert et al., Electroretinography in patents with winter seasonal affective disorder, Psychiatry Research 127, 2004.
Holopigian et al., The effects of dopamine blockade on the human flash electroretinogram, Documenta Ophthalmologica 86: 1-10, 1994.
Jahshan et al., Nonconscious and counsious color priming in schizophrenia, Journal of Psychiatric Reseach 2012.
Lam et al., Electroretinography in seasonal affective disorder, Psychiatry Res 1992.
Lavoie et al., Electroretinogram anomalies in Psychiatric disorders: The possible implication of GSK3, May 10, 2012.
Lavoie et al., The electroretinogram as a biomarker of central dopamine and serotonin: potential relevance to psychiatric disorders, Biol. Psychiatry, vol. 75, No. 6, pp. 479-486, Jan. 7, 2013.
Llewellyn, If waking and dreaming consciousness became dedifferentiated, would schizophrenia result?, Consciousness and Cognition, Elsevier Inc 2011.
Hori et al., Several prescription patterns of antipsychotic drugs influence cognitive functions in Japanese chronic schizophrenia

(56) References Cited

OTHER PUBLICATIONS patents, Abstracts of the 3rd Biennial Schizophrenia International Reseach Conference / Schizophrenia Research 136, Supplement 1, S1-S375, 2012.
Maziade et al., Shared and specific susceptibility loci for schizophrenia and bipolar disorder: a dense genome scan in Eastern Quebec families, Molecular Psychiatry, 10, 486-499, 2005.
Miller, Functional neuro-ophthalmology, Handbook of Clinical Neurology, vol. 102, 2011.
Realmuto et al., Electroretinograms (ERGs) in Four Autistic Probands and Six First-Degree Relatives, Canadian Vol. of Psychiatry 1989.
Schechter, Electroniretinographic assessment in schizophrenia, Elec Clin Neuro Suppl., 1987.
Seggie et al., Electroretinographic (ERG) changes in Depression, Clin Invest Med, 1990.
Tzelepi, The push-pull action of dopamine on spatial tuning of the monkey retina: the effects of dopaminergic deficiency and selective D1 and D2 receptor ligands on the pattern electroretinogram, Vision Reseach 38, 1479-1487, 1998.
Warner et al., Retinal function as a marker for cell membrane Omega-3 fatty acid depletion in schizophrenia: a pilot study, Biol Psychiatry 1999; 45:1138-1142.
Yeap et al., Visual sensory processing deficits in schizophrenia and their relationship to disease state, Eur Arch Psichiatry Clin Neurosci (2008) 258:3005-3016.
Lavoie et al., Evidence of a biological effect of light therapy on the retina of patients with seasonal affective disorder, Biological Psychiatry, vol. 63, No. 3, 2009.
Fournier et al., Prediction of response to medication and cognitive therapy in the treatment of moderate to severe depression, J. Counsult. Clin. Psychol., 77(4):775-87, Aug. 2009.
Johnson et al., The photomyoclonic reflex: an artefact in the clinical electroretinogram, British Journal of Ophtalmology, 1982.

\* cited by examiner

SYSTEMS AND METHODS FOR RETINAL STIMULATION AND/OR COLLECTING RETINAL SIGNAL DATA

CROSS-REFERENCE TO RELATED APPLICATIONS

This application claims the benefit of U.S. Provisional Patent Application No. 63/308,169, filed Feb. 9, 2022, and is related to U.S. patent application Ser. No. 17/345,419, filed Jun. 11, 2021, each of which is incorporated by reference herein in its entirety.

FIELD

The present technology relates to systems and methods for retinal stimulation by light, collecting retinal signal data and/or processing retinal signal data.

BACKGROUND

A signal is a function that conveys information generally about the behavior of a physical or physiological system, or the attributes of some phenomenon. Retinal signal data, such as electroretinograms (ERG) data, may be collected for analysis. The retinal signal data may be collected using sensors such as one or more electrodes attached to an individual. The electrodes may capture electrical signals. The electrical signals originate from specific cells located in the retina. The electrical signals are triggered by light stimulation and are responsive to the light stimulation. A light stimulator may be used to trigger the electrical signals. ERG are commonly recorded in ophthalmology and optometry applications to assess retinal function.

During the retinal stimulation and capture of retinal signal data, various factors may affect the retinal signal data, such as movement of the eye and the eye lids, intensity and wavelength of the light stimulation, intensity and wavelength of the background light, light intensity waveform, duration and sequence of light stimulation, areas of the retina illuminated, time during which the retinal signal data is collected, and/or other characteristics of the circuit collecting the electrical signals or the individual. It is an object of the present technology to ameliorate at least some of the limitations present in the prior art.

SUMMARY

Embodiments of the present technology have been developed based on developers' appreciation of certain shortcomings associated with existing systems for collecting retinal signal data. The characteristics of the retinal signal data elicited by light stimulation is directly dependent upon the characteristics of the light stimulation. The characteristics of the light stimulation triggering the retinal signal data may be collected and used during analysis of the retinal signal data. This collected light stimulation data may be used to extract biomarkers and/or collect relevant descriptors (biosignature) from the retinal signal data. Furthermore, the light stimulation characteristics may be considered when analysing retinal signal data, as co-variables of that retinal signal data.

Existing systems for collecting retinal signal data might not collect data about the individual that may be relevant to the retinal signal data, such as eye position, pupil size, pupil area, light beam illumination axis (optical axis), area of the retina that has been stimulated, and/or other data about the individual. Indeed, the amount of light reaching the retina and the area of the retina that has been illuminated, is not only dependent upon the pupil area, but also upon the beam illumination axis (i.e. optical axis) and the eye movement (rotation) around this axis. Existing systems for collecting retinal signal data might not collect data about the system that may impact the retinal signal data, such as timing information, angle at which the light reaches the retina, light intensity, light spectrum, light intensity waveform, duration and sequence of light stimulation, and/or other data about the system triggering the retinal signal and/or collecting the data. Rather than measuring this data, existing systems may simply record the intended values contained in the settings, but not record and/or control continuously in real time the actual values. For various reasons, such as design and manufacturing issues, component tolerances, components wearing out, changes in calibration, absence of real time measurement and/or control, etc., the set values and actual measured values may differ.

The system described herein may allow for more precise control of various parameters during light stimulation of the retina and subsequent collection of the retinal signal data. It may also allow for continuous adjustment of those values depending upon the measured actual values. This may lead to improvements in the collected retinal signal data, such as a reduction in artifacts, improvement in the relevancy of collected data, more precision in the collected retinal signal data, collection of information directly impacting on the retinal signal data which may be used to analyze the retinal signal data, and/or other improvements.

The retinal signal data may include artifacts. These artifacts may impede further analysis of the retinal signal data. These artifacts might also be transient or occurring within a very short period of time, and therefore difficult or impossible to detect without continuous monitoring. It may be preferable to use retinal signal data that does not contain artifacts and/or that contains less artifacts. A dynamic resistance of a circuit collecting the retinal signal data, such as the impedance of the circuit, may be used to determine whether the retinal signal data contains artifacts. U.S. patent application Ser. No. 17/345,419, incorporated herein by reference in its entirety, describes methods and systems that may be used to remove artifacts from retinal signal data and/or reduce the impact of artifacts on the retinal signal data.

Embodiments of the present technology have been developed based on the developers' observation that data obtained in electroretinograms (ERG) may provide some insight into determining conditions, such as medical conditions. However, existing methods to collect and analyse electroretinograms (ERG) can only collect and analyse a limited volume of information from the captured electrical signals. It was found that expansion of the nature and the volume of information collected regarding retinal response to light stimulation allowed generating retinal signal data with a higher density of information, a higher volume of information, and/or additional types of information. This method to collect retinal signal data with higher density of information enables a multimodal mapping of the electrical signals and/or other data and allows the detection of additional information in the multimodal mapping specific to certain conditions. The multimodal mapping may include multiple parameters of the retinal signal data, such as time, frequency, light stimulation parameters, areas of the retina impacted by the light stimulation, and/or any other parameters.

Several types of information or data which have a direct impact on the retinal signals are not collected during conventional ERG recording. However, as developers have noted that the triggered electrical signals may be directly dependent on those parameters, embodiments of the present technology include real-time measurement of any one or more of: light spectrum, light intensity, form of the light stimulation signal, illuminated area, pupil size, pupil position, and/or impedance of the circuit collecting the electrical signals. The system described herein may be configured to measure some or all of these parameters.

Embodiments of the present technology form the basis for collecting and/or processing of retinal signal data which has more volume of information, more density of information and/or additional types of information detail compared to conventional ERG data. The number and/or range of light intensities of the light stimulation may be increased. This retinal signal data allows, in certain embodiments, the mathematical modeling of datasets containing a multiplicity of information, and the ability to identify biomarkers and/or biosignatures in the retinal signal data using for example a specific pattern of the retinal signal detected in certain pathological conditions. Certain, non-essential, embodiments of the present technology also provide methods for collecting the retinal signal data which has more volume of information, more density of information and/or additional types of information compared to conventional ERG data.

In some instances, the retinal signal data, or any other signal data associated with light stimulation may contain artifacts. The artifacts may include distorted signals, interferences, and/or any other type of artifacts. The artifacts may occur through one or more of: signals not originating from the retina being inadvertently captured, shifts in the electrode positioning, changes in the ground or reference electrode contact, photomyoclonic reflex, eye lid blinks, ocular movements, and/or external electrical interferences. These artifacts may restrain further analysis of the retinal signal data, or skew the further analysis. It would be beneficial if these artifacts could be removed, compensated for, or prevented.

Parameters of the electrical signals emitted by an individual may be measured, such as voltage, current, impedance, conductance, and/or any other parameters, such as other parameters related to the circuit collecting the retinal signal. The parameters may be measured continuously over a period of time. During the period of time, the individual may be exposed to a flash of light. Parameters of the flash of light may be measured, such as the light intensity, spectrum, timing and form of the flash, and/or any other parameters of the flash of light. Attributes of the individual may be measured before, during, and/or after the flash of light, such as pupil size, and/or any other attributes of the individual that may affect the retinal signal data.

The data collected prior to the flash of light may be used as calibration data. The data collected after the flash of light may be retinal signal data. Baseline parameters of the electrical circuit capturing the electrical signals may be determined using the calibration data, such as a baseline voltage, baseline current, baseline impedance, and/or any other parameters. A threshold impedance may be determined based on the baseline impedance. The retinal signal data may be compared to the threshold impedance. If the impedance of the circuit during collection of the retinal signal data surpasses the threshold impedance, the retinal signal data may be determined to have artifacts or other events which may be attended to and/or corrected. An amount of change of the impedance of the circuit and/or a rate of change of the impedance may also be determined to indicate a presence of an artifact.

In conventional ERG, a flash of light having the same parameters may be repeated multiple times, such as ten times. The electrical signals responsive to the flash may be collected each time. Data regarding those electrical signals may be averaged, such as by determining an average voltage of the electrical signals. The same flash of light (i.e. a flash of light having the same flash parameters) may be repeated to reduce the impact of artifacts on the collected data. For example if the flash of light is repeated ten times, and artifacts occur in the electrical signals responsive to one of those flashes, the impact of those artifacts will be reduced by combining the data collected after that flash of light with the data collected after the other nine flashes of light.

Artifacts may be detected through other means, such as by monitoring the dynamic resistance of the collecting circuit, such as the impedance, admittance, and/or susceptance of the circuit collecting the electrical signals. Rather than repeating the same flash of light multiple times, retinal signal data responsive to a single flash of light and/or a reduced number of flashes of light may be collected. The retinal signal data may be analyzed to determine whether the retinal signal data contains artifacts. For example the impedance of the retinal signal data may be compared to a threshold impedance. If the impedance of the retinal signal data does not exceed the threshold impedance, the retinal signal data may be determined not to contain artifacts. The retinal signal data may then be stored. In this manner, retinal signal data may be collected without repeating the flash of light having the same parameters and/or the amount of times that a flash of light having the same parameters is repeated may be reduced. This may reduce the amount of time used for collecting the retinal signal data and/or decrease the impact of artifacts on the retinal signal data.

In certain embodiments, a more efficient processing of retinal signal data is possible compared to ERG data collected using conventional methods. The advantage of retinal signal data as compared to the conventional ERG data, is to benefit from a larger amount of information related to the electrical signals. This additional data may be used to identify artifacts in the retinal signal data, remove the artifacts in the retinal signal data, reduce the artifacts in the retinal signal data, and/or otherwise compensate for the artifacts in the retinal signal data.

In certain embodiments, artifacts are detected and/or removed from the retinal signal data. The artifacts may be detected and/or removed after the collection of retinal signal data is complete and/or in real-time during the collection of the retinal signal data. If the artifacts are detected during collection of the retinal signal data, an indication may be displayed to an operator that artifacts have been detected. The parameters of the flash of light that was triggered prior to the retinal signal data with artifacts may be determined and a flash of light having the same parameters may be triggered. Retinal signal data occurring after that flash of light may be captured and/or stored for further analysis.

As described above, parameters of the light that the individual is exposed to, either directly (light stimulation) or indirectly (background light), may be collected, such as light spectrum, intensity, form and sequence. If the measured light spectrum, intensity, form or sequence does not match the light spectrum, intensity, form or sequence that was specified, the settings may be adjusted and a flash of light with the new settings may be triggered in order to collect retinal signal data that is generated in response to the desired light spectrum, intensity, form and/or sequence.

According to a first broad aspect of the present technology, there is provided an apparatus for retinal stimulation, the apparatus comprising a housing supporting: one or more light sources configured to expose a retina of an eye of an individual to a flash of light; a spectrometer configured to record a light spectrum and an intensity of the flash of light; and a camera configured to capture image data of the eye while exposed to the flash of light.

In some implementations of the apparatus, the apparatus is a head-worn apparatus to be worn on a head of the individual.

In some implementations of the apparatus, the apparatus comprises an eye shade for enclosing the eye of the individual, and the eye shade is configured to block external light from entering the eye of the individual.

In some implementations of the apparatus, the apparatus further comprises a light reflector configured to direct light from the one or more light sources towards the eye of the individual.

In some implementations of the apparatus, the apparatus further comprises a controller communicatively coupled to the one or more light sources, the spectrometer and the camera, and the controller is configured to adjust a parameter of the one or more light sources based on data from the spectrometer.

In some implementations of the apparatus, the controller comprises a control circuit supported by the housing and configured to receive data from the spectrometer.

In some implementations of the apparatus, the camera is in communication with the controller, and the controller executes instructions that determine, based on data received from the camera: a position of the eye of the individual, a pupil size of the eye of the individual, or a shape of the eye of the individual.

In some implementations of the apparatus, the apparatus further comprises one or more electrodes attachable to the individual and configured to collect electrical signals from the individual.

In some implementations of the apparatus, the apparatus further comprises one or more electrodes attachable to the individual and configured to collect electrical signals from the individual, the one or more electrodes communicatively connectable to the controller, the controller being configured to receive electrical signal data from the electrodes.

In some implementations of the apparatus, the apparatus further comprises a battery for providing power to one or more of: the one or more light sources, the spectrometer, and the camera.

In some implementations of the apparatus, the apparatus further comprises a networking device.

In some implementations of the apparatus, the apparatus further comprises a safety module configured to monitor a temperature of the apparatus.

In some implementations of the apparatus, the apparatus further comprises one or more amplifiers and one or more filters.

In some implementations of the apparatus, the one or more light sources comprise a light emitting diode (LED).

In some implementations of the apparatus, the one or more light sources, the spectrometer and the camera define a first sub-system configured for retinal stimulation of a first eye of the individual, the apparatus further comprising a second sub-system configured for retinal stimulation for a second eye of the individual, the second sub-system comprising another set of light sources, spectrometer and camera.

According to another broad aspect of the present technology, there is provided a system for collecting retinal signal data, the system comprising: one or more light sources configured to expose a retina of an eye of an individual to a flash of light; a spectrometer configured to record a light spectrum and an intensity of the flash of light; and a controller communicatively coupled to one or more of: the one or more light sources, and the spectrometer, wherein the controller is configured to: adjust a parameter of the one or more light sources based on data from the spectrometer, expose the retina to an adjusted flash of light, and receive electrical signals produced by the retina of the individual in response to the adjusted flash of light.

In some implementations of the system, the controller comprises a processor of a computer system communicatively couplable with the one or more light sources and the spectrometer.

In some implementations of the system, the controller comprises a control circuit, the control circuit is communicatively coupled to the one or more light sources, and the control circuit is communicatively coupled to the spectrometer and configured to receive data from the spectrometer.

In some implementations of the system, the system further comprises a light reflector configured to direct light from the one or more light sources towards the eye of the individual, where the light reflector is spheroidal and includes an eye shade portion around a light outlet of the light reflector, the eye shade portion is configured to enclose the eye of the individual, and the eye shade portion is configured to minimize or block external light from entering a housing of the system.

In some implementations of the system, the system further comprises one or more electrodes attachable to the individual and which are communicatively couplable with the controller, and the electrodes are configured to collect the electrical signals produced by the retina of the individual.

In some implementations of the system, the system further comprises a battery for providing power to one or more of: the one or more light sources, and the spectrometer.

In some implementations of the system, the system further comprises a camera, the camera is in communication with the controller, and the controller is configured to execute instructions that determine, based on data received from the camera: a position of the eye of the individual, a pupil size of the eye of the individual, or a shape of the eye of the individual.

In some implementations of the system, the system further comprises a networking device, a safety module configured to monitor a temperature of the system, or one or more amplifiers and one or more filters.

In some implementations of the system, the system further comprises a housing, the housing is configured to support the one or more light sources and the spectrometer, the housing has a portion for enclosing the eye of the individual, and the housing has a wearable configuration.

In some implementations of the system, the housing comprises a helmet to be worn on a head of the individual, or eye wear configured to be worn over eyes.

In some implementations of the system, the helmet or the eye wear comprises one or more straps to secure the helmet or the eye wear to the individual.

In some implementations of the system, the one or more light sources comprise a light emitting diode (LED).

In some implementations of the system, the one or more light sources and the spectrometer define a first sub-system configured for retinal stimulation of a first eye of the individual, and the system further comprises a second sub-system configured for retinal stimulation of a second eye of the individual, the second sub-system comprising another set of light sources, and another spectrometer.

In some implementations of the system, the parameter comprises a wavelength of the one or more light sources or an intensity of the one or more light sources.

According to another broad aspect of the present technology, there is provided a method for collecting retinal signal data, the method configured to be executed by a processor of a system for collecting retinal signal data, the method comprising: causing one or more light sources to output a first flash of light at a selected wavelength and a selected intensity to an individual; receiving, from a spectrometer, a measured wavelength and a measured intensity of the first flash of light; determining that the measured wavelength and the measured intensity is not within a pre-determined tolerance of the selected wavelength and the selected intensity; determining, based on a difference between the selected wavelength and the measured wavelength, and based on a difference between the selected intensity and the measured intensity, parameters for a second flash of light; causing the one or more light sources to output the second flash of light based on the parameters; and receiving, from a sensor associated with the individual, retinal signal data of the individual responsive to the second flash of light.

In some implementations of the method, the method further comprises receiving, from the sensor, retinal signal data of the individual responsive to the first flash of light.

In some implementations of the method, the one or more light sources and the spectrometer are integrated in a housing of an apparatus, and the apparatus further comprises a camera.

In some implementations of the method, the method further comprises receiving, from the camera, data regarding a pupil of the individual; and determining, based on the data from the camera, a pupil size or shape when viewed from a fixed point of the individual that was exposed to the second flash of light.

In some implementations of the method, the method further comprises determining, based on the data from the camera, an area of the retina of the individual that was exposed to the second flash of light.

In some implementations of the method, the method further comprises adjusting, based on the pupil size and shape, the retinal signal data, or determining, based on the pupil size and shape, to re-record the retinal signal data.

In some implementations of the method, the method further comprises receiving calibration data corresponding to the individual; determining, based on the calibration data, a threshold impedance of a circuit that collected the retinal signal data; determining that an impedance of the circuit has surpassed the threshold impedance; and after determining that the impedance of the circuit has surpassed the threshold impedance, re-recording the retinal signal data.

According to another broad aspect of the present technology, there is provided a system for collecting retinal signal data, the system comprising: one or more light sources configured to expose a retina of an eye of an individual to flashes of light; and a spectrometer configured to record a light spectrum and an intensity of the flashes of light, wherein the system is configured to collect electrical signals produced by the retina of the individual in response to the flash of light; and at least one processor and memory storing executable instructions which, when executed by the at least one processor, cause the system to: output, by the one or more light sources, a first flash of light at a selected wavelength and a selected intensity to the individual; receive, from the spectrometer, a measured wavelength and a measured intensity of the first flash of light; determine that the measured wavelength and the measured intensity is not within a pre-determined tolerance of the selected wavelength and the selected intensity; determine, based on a difference between the selected wavelength and the measured wavelength, and based on a difference between the selected intensity and the measured intensity, parameters for a second flash of light; cause the one or more light sources to output the second flash of light based on the parameters; and receive, from an electrode associated with the individual, retinal signal data of the individual responsive to the second flash of light.

In some implementations of the system, the retinal signal data comprises data from the spectrometer.

In some implementations of the system, the instructions further cause the system to: receive calibration data corresponding to the individual; determine, based on the calibration data, a threshold impedance of a circuit that collected the retinal signal data; determine that an impedance of the circuit has surpassed the threshold impedance; and after determining that the impedance of the circuit has surpassed the threshold impedance, re-record the retinal signal data.

In some implementations of the system, the system further comprises a camera, and the instructions further cause the system to determine, based on the data from the camera, a pupil size and shape of the individual that was exposed to the second flash of light.

In some implementations of the system, the instructions further cause the system to receive, from the electrode, retinal signal data of the individual responsive to the first flash of light.

According to another broad aspect of the present technology, there is provided an apparatus for retinal stimulation, the apparatus comprising a housing supporting: a first light source configured to expose a retina of a left eye of an individual to a first flash of light; a second light source configured to expose a retina of a right eye of the individual to a second flash of light; a first spectrometer configured to record a light spectrum and an intensity of the first flash of light from the first light source; a second spectrometer configured to record a light spectrum and an intensity of the second flash of light from the second light source; a first camera configured to capture image data of the left eye while exposed to the first flash of light; and a second camera configured to capture image data of the right eye while exposed to the second flash of light.

In some implementations of the apparatus, the first light source and the second light source are configured to output the first flash of light and the second flash of light simultaneously.

In some implementations of the apparatus, the apparatus further comprises a controller communicatively coupled to the first light source and the first spectrometer, wherein the controller is configured to adjust a wavelength or an intensity of the first light source based on data from the first spectrometer.

In some implementations of the apparatus, the controller is configured to adjust a wavelength or intensity of the second light source based on data from the second spectrometer.

In some implementations of the apparatus, the apparatus further comprises a controller communicatively coupled to the first light source and the first camera, and the controller is configured to determine: a distance between the first camera and an iris of the left eye, a distance between the first light source and the iris of the left eye, a pupil size of the left eye, a pupil shape of the left eye, or an eye position of the left eye.

In some implementations of the apparatus, the apparatus further comprises a controller communicatively coupled to the second light source and the second camera, and the controller is configured to determine: a distance between the second camera and an iris of the right eye, a distance between the second light source and the iris of the right eye, a pupil size of the right eye, a pupil shape of the right eye, or an eye position of the right eye.

According to another broad aspect of the present technology, there is provided a method for collecting retinal signal data, the method configured to be executed by a processor of a system for collecting retinal signal data, the method comprising: causing one or more light sources to output a flash of light at a selected wavelength and a selected intensity to an individual; receiving, from a camera, an image of an eye of the individual; and determining, based on the image, an area of a retina of the eye that was exposed to the flash of light.

In some implementations of the method, the method further comprises determining, based on the image, a distance between the camera and an iris of the eye, and wherein determining the area of the retina comprises determining, based on the distance between the camera and the iris, the area of the retina that was exposed to the flash of light.

In some implementations of the method, the method further comprises determining, based on the image, a distance between the one or more light sources and an iris of the eye, and determining the area of the retina by determining, based on the distance between the one or more light sources and the iris, the area of the retina that was exposed to the flash of light.

In some implementations of the method, the method further comprises determining, based on the image, a pupil size, or shape, or area of the eye, and determining the area of the retina by determining, based on the pupil size, or shape, or area, the area of the retina that was exposed to the flash of light.

In some implementations of the method, the method further comprises determining, based on the image, a position of the eye, and determining the area of the retina by determining, based on the position of the eye, the area of the retina that was exposed to the flash of light.

According to another broad aspect of the present technology, there is provided an apparatus for retinal stimulation, the apparatus comprising a housing supporting: one or more light sources configured to expose a retina of an eye of an individual to a flash of light; a spectrometer configured to record a light spectrum and an intensity of the flash of light; and a camera configured to capture image data of the eye while exposed to the flash of light.

In some implementations of the apparatus, the apparatus is a head-worn apparatus to be worn on a head of the individual.

In some implementations of the apparatus, the apparatus comprises an eye shade for enclosing the eye of the individual.

In some implementations of the apparatus, the eye shade is configured to block external light from entering the eye of the individual.

In some implementations of the apparatus, the apparatus further comprises a light reflector configured to direct light from the one or more light sources towards the eye of the individual.

In some implementations of the apparatus, the apparatus further comprises a light at the bottom of the light reflector for the subject to fix the gaze and ensure the vision axis is centered onto the aperture of the light reflector.

In some implementations of the apparatus, the apparatus further comprises a photometer coupled to the one or more light sources, the spectrometer and the camera, wherein the photometer is configured to adjust a parameter of the one or more light sources based on data from the photometer.

In some implementations of the apparatus, the apparatus further comprises a controller communicatively coupled to the one or more light sources, the spectrometer and the camera, wherein the controller is configured to adjust a parameter of the one or more light sources based on data from the spectrometer or the photometer.

In some implementations of the apparatus, the controller comprises a control circuit supported by the housing and configured to receive data from the spectrometer.

In some implementations of the apparatus, the camera is in communication with the controller, and wherein the controller executes instructions that determine, based on data received from the camera, a position of the eye of the individual or a pupil size of the eye of the individual.

In some implementations of the apparatus, the apparatus further comprises one or more electrodes attachable to the individual and configured to collect electrical signals from the individual.

In some implementations of the apparatus, the apparatus further comprises one or more electrodes attachable to the individual and configured to collect electrical signals from the individual, the one or more electrodes communicatively connectable to the controller, the controller being configured to receive electrical signal data from the electrodes.

In some implementations of the apparatus, the apparatus further comprises a battery for providing power to one or more of: the one or more light sources, the spectrometer, and the camera.

In some implementations of the apparatus, the apparatus further comprises a networking device.

In some implementations of the apparatus, the apparatus further comprises a safety module configured to monitor a temperature of the apparatus.

In some implementations of the apparatus, the apparatus further comprises one or more amplifiers and one or more filters.

In some implementations of the apparatus, the one or more light sources comprise a light emitting diode (LED).

In some implementations of the apparatus, the one or more light sources, the spectrometer and the camera define a first sub-system configured for retinal stimulation of a first eye of the individual, the apparatus further comprising a second sub-system configured for retinal stimulation for a second eye of the individual, the second sub-system comprising another set of light sources, spectrometer and camera.

According to another broad aspect of the present technology, there is provided a system for retinal stimulation, the system comprising the apparatus described above, and a processor of a computer system configured to send instructions to, and/or receive data from, the one or more light sources, the spectrometer and the camera.

In some implementations of the system, the processor is configured to adjust a parameter of the one or more light sources based on data from the spectrometer.

According to another broad aspect of the present technology, there is provided a system for collecting retinal signal data, the system comprising: one or more light sources configured to expose a retina of an eye of an individual to a flash of light; a spectrometer configured to record a light spectrum and an intensity of the flash of light; and a controller communicatively coupled to one or more of:

the one or more light sources, and the spectrometer, wherein the controller is configured to: adjust a parameter of the one or more light sources based on data from the spectrometer, expose the retina to an adjusted flash of light, and receive electrical signals produced by the retina of the individual in response to the adjusted flash of light.

In some implementations of the system, the controller comprises a processor of a computer system communicatively couplable with the one or more light sources, and the spectrometer.

In some implementations of the system, the controller comprises a control circuit communicatively coupled to the one or more light sources.

In some implementations of the system, the control circuit is communicatively coupled to the spectrometer and configured to receive data from the spectrometer.

In some implementations of the system, the system further comprises a light reflector configured to direct light from the one or more light sources towards the eye of the individual.

In some implementations of the system, the light reflector is spheroidal and includes an eye shade portion around a light outlet of the light reflector, the eye shade portion being configured to enclose the eye of the individual.

In some implementations of the system, the eye shade portion is configured to minimize or block external light from entering a housing of the system.

In some implementations of the system, the system further comprises one or more electrodes attachable to the individual and which are communicatively couplable with the controller, and wherein the electrodes are configured to collect the electrical signals produced by the retina of the individual.

In some implementations of the system, the system further comprises a battery for providing power to one or more of: the one or more light sources, and the spectrometer.

In some implementations of the system, the system further comprises a camera, wherein the camera is configured to monitor a size of a pupil of the eye and/or a position of the eye of the individual.

In some implementations of the system, the camera is in communication with the controller, and the controller is configured to execute instructions that determine, based on data received from the camera, the position of the eye of the individual and/or the size of a pupil of the eye.

In some implementations of the system, the system further comprises a networking device.

In some implementations of the system, the system further comprises a safety module configured to monitor a temperature of the system.

In some implementations of the system, the system further comprises one or more amplifiers and one or more filters.

In some implementations of the system, the system further comprises a housing configured to support the one or more light sources and the spectrometer and having a portion for enclosing the eye of the individual.

In some implementations of the system, the housing has a wearable configuration.

In some implementations of the system, the housing comprises a helmet to be worn on a head of the individual, or eye wear configured to be worn over eyes.

In some implementations of the system, the helmet or the eye wear comprises one or more straps to secure the helmet or the eye wear to the individual.

In some implementations of the system, the one or more light sources comprise a light emitting diode (LED).

In some implementations of the system, the one or more light sources, and the spectrometer define a first sub-system configured for retinal stimulation of a first eye of the individual, the system further comprising a second sub-system configured for retinal stimulation of a second eye of the individual, the second sub-system comprising another set of light sources, and another spectrometer.

According to another broad aspect of the present technology, there is provided a method for collecting retinal signal data, the method configured to be executed by a processor of a system for collecting retinal signal data, the method comprising: causing one or more light sources to output a first flash of light at a selected wavelength and a selected intensity to an individual; receiving, from a spectrometer, a measured wavelength and a measured intensity of the first flash of light; determining that the measured wavelength and the measured intensity is not within a pre-determined tolerance of the selected wavelength and the selected intensity; determining, based on a difference between the selected wavelength and the measured wavelength, and based on a difference between the selected intensity and the measured intensity, parameters for a second flash of light; causing the one or more light sources to output the second flash of light based on the parameters; and receiving, from a sensor associated with the individual, retinal signal data of the individual responsive to the second flash of light.

In some implementations of the method, the method further comprises receiving, from the sensor, retinal signal data of the individual responsive to the first flash of light.

In some implementations of the method, the one or more light sources and the spectrometer are integrated in a housing of an apparatus.

In some implementations of the method, the apparatus further comprises a camera.

In some implementations of the method, the apparatus further comprises a system to adjust the focus of the camera to ensure clear picture of the eye.

In some implementations of the method, the method further comprises receiving, from the camera, data regarding a pupil of the individual.

In some implementations of the method, the method further comprises determining, based on the data from the camera, a pupil area of the individual that was exposed to the second flash of light.

In some implementations of the method, the method further comprises adjusting, based on the pupil area, the retinal signal data.

In some implementations of the method, the method further comprises determining, based on the pupil area, to re-record the retinal signal data.

In some implementations of the method, the method further comprises receiving calibration data corresponding to the individual.

In some implementations of the method, the method further comprises determining, based on the calibration data, a threshold impedance of a circuit that collected the retinal signal data.

In some implementations of the method, the method further comprises: determining that an impedance of the circuit has surpassed the threshold impedance; and after determining that the impedance of the circuit has surpassed the threshold impedance, re-recording the retinal signal data.

According to another broad aspect of the present technology, there is provided a system for collecting retinal signal data, the system comprising: one or more light sources configured to expose a retina of an eye of an individual to flashes of light; and a spectrometer configured to record a light spectrum and an intensity of the flashes of light, wherein the system is configured to collect electrical signals produced by the retina of the individual in response to the flash of light; and at least one processor and memory storing executable instructions which, when executed by the at least one processor, cause the system to: output, by the one or more light sources, a first flash of light at a selected wavelength and a selected intensity to the individual; receive, from the spectrometer, a measured wavelength and a measured intensity of the first flash of light; determine that the measured wavelength and the measured intensity is not within a pre-determined tolerance of the selected wavelength and the selected intensity; determine, based on a difference between the selected wavelength and the measured wavelength, and based on a difference between the selected intensity and the measured intensity, parameters for a second flash of light; cause the one or more light sources to output the second flash of light based on the parameters; and receive, from an electrode associated with the individual, retinal signal data of the individual responsive to the second flash of light.

In some implementations of the system, the retinal signal data comprises data from the spectrometer.

In some implementations of the system, the instructions further cause the system to receive calibration data corresponding to the individual.

In some implementations of the system, the instructions further cause the system to determine, based on the calibration data, a threshold impedance of a circuit that collected the retinal signal data.

In some implementations of the system, the instructions further cause the system to: determine that an impedance of the circuit has surpassed the threshold impedance; and after determining that the impedance of the circuit has surpassed the threshold impedance, re-record the retinal signal data.

In some implementations of the system, the system further comprises a camera configured to record a pupil size of the eye while exposed to the flashes of light.

In some implementations of the system, the retinal signal data comprises data from the camera.

In some implementations of the system, the instructions further cause the system to determine, based on the data from the camera, a pupil area of the individual that was exposed to the second flash of light.

In some implementations of the system, the instructions further cause the system to receive, from the electrode, retinal signal data of the individual responsive to the first flash of light.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
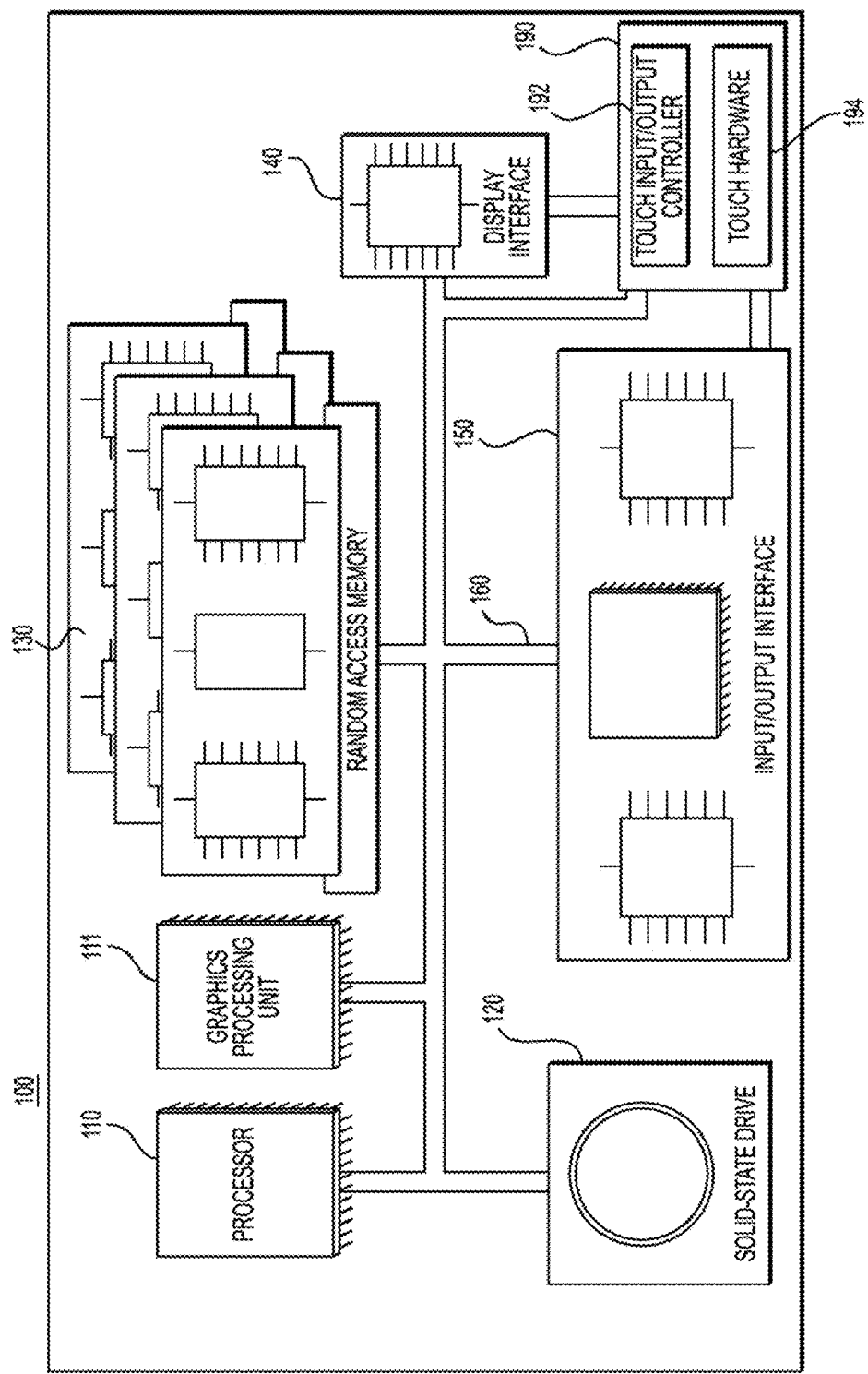
FIG. 1 is a block diagram of an example computing environment in accordance with various embodiments of the present technology.

It should be noted that, unless otherwise explicitly specified herein, the drawings are not to scale.

DETAILED DESCRIPTION

Certain aspects and embodiments of the present technology are directed to methods and systems for collecting retinal signal data. An apparatus may be used for collecting the retinal signal data. The apparatus may include a housing that is placed on an individual's head, such as a helmet. The apparatus may include a light source. The light source may expose the individual's eyes to a flash of light or a series of flashes of light. The apparatus may include a light reflector. The light reflector may reflect the flash of light from the light source. The light reflector may direct the flash of light towards the individual's eye or eyes.

The apparatus may include a spectrometer. The spectrometer may measure parameters of the flash of light, such as an intensity, a light spectrum, the form and/or the sequence of the flash of light. If the measured parameters do not match the intended parameters of the flash of light, adjustments may be made to the parameters of the flash of light, and the light sources may output an adjusted flash of light. The apparatus may contain a controller. The controller may adjust the parameters and/or cause the light source to emit the flash of light. The spectrometer may comprise an ultra-compact spectrometer, such as but not limited to Mini-spectrometer C12880MA or C12666MA by Hamamatsu. In certain embodiments, the spectrometer has a spectral response range of 340-850 nm, or 340-780 nm.

The apparatus may contain a camera. The camera may be used to monitor the individual's eyes. The cameras may capture video or images of one or both of the individual's eyes. The camera data may be used to determine a pupil size, shape, and/or position before, during, or after exposure to the flash of light.

Certain aspects and embodiments of the present technology comprise a process to obtain retinal signal data by e.g. enlarging the conditions for light stimulation (e.g. number and range of light intensities, light spectrum or light waveforms), recording the dynamic resistance (impedance) of the circuit used to collect the retinal signal in the electrical components of the signal itself, recording data about the flash of light, recording data about the illuminated surface of the retina where the flash trigger is directed, capturing retinal signal data for a longer period of time, monitoring and adjusting parameters of the flash of light if the measured parameters do not match the intended parameters, and/or capturing retinal signal data at a higher frequency (sampling rate). The system for collecting the retinal signal data may measure and/or control parameters of the light stimulation and/or attributes of the individual, such as based on data received from a spectrometer and/or a camera.

The retinal signal data may be analysed and/or processed to remove artifacts in the retinal signal data. The artifacts may be caused by capture of electrical signals which are not originating from the retina. The artifacts may include distorted electrical signals in the retinal signal data which may have occurred due to, e.g., shift in the electrode positioning or contact with the surface from where the signal is collected, change in the ground or reference electrode contact, photomyoclonic reflex, eye lid blinks, and/or ocular movements. The artifacts may be detected and/or removed based on impedance values of the electrical circuit used to collect the retinal signal data. Signal amplitude values of the retinal signal data may be corrected based on the impedance values. Portions of the retinal signal data corresponding to the artifacts may be removed from the retinal signal data.

The parameters of light stimulation, e.g. light spectrum, light intensity, light waveform, and/or duration of the light stimulation or the surface illuminated may have a direct impact on the electrical signals that are triggered by the light stimulation. These parameters may be measured, such as in real-time during collection of the retinal signal data. These parameters may lead to a more accurate recording and/or analysis of the electrical signals. The measured values of the parameters may be used to adjust settings of the retinal signal data collection system, such as to account for differences between set parameter values and measured values of the parameters. These parameters may be measured by a spectrometer, a photometer and/or a camera.

Certain aspects and embodiments of the present technology provide methods and systems that can convert the retinal signal data (voltage amplitude) in electric current values (flow of electric charges) by using the real-time recording of impedance. This conversion may be performed in real-time during collection of the retinal signal data.

Certain aspects and embodiments of the present technology provide methods and systems that can detect the occurrence of artifacts by analysing the impedance of the circuit collecting the electrical signals (including some or all of the electrodes that are part of that circuit). The detection of artifacts may be performed in real-time during collection of the retinal signal data. Certain aspects and embodiments of the present technology provide methods and systems that can correct artifacts by converting the retinal signal data into current and analysing the time-current function as opposed to the time-voltage function. Certain aspects and embodiments of the present technology provide methods and systems that can remove artifacts by reconstructing the retinal signal data based upon predefined impedance thresholds.

The systems and methods described herein may be fully or at least partially automated so as to minimize an input of a clinician in collecting and/or processing the retinal signal data.

The systems and methods described herein may be based on retinal signal data having a higher level of information compared to data captured by conventional ERG. The collected retinal signal data may be analyzed using mathematical and statistical calculations. Graphical representations of the findings may be developed and output. Applications may apply mathematical and/or statistical analysis of the results, allowing comparisons between various conditions. Based upon the retinal signal data and/or any other clinical information, classifiers may be constructed which identify conditions corresponding to the retinal signal data.

Computing Environment

FIG. 1 illustrates a computing environment 100, which may be used to implement and/or execute any of the methods described herein. In some embodiments, the computing environment 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. Some or all of the systems illustrated in the computing environment 100 may be integrated within a system for collecting retinal signal data, such as those described in FIGS. 2 and 6-24 and in further detail below.

In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the computing environment 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Retinal Signal Data Processing System

Figure 2:
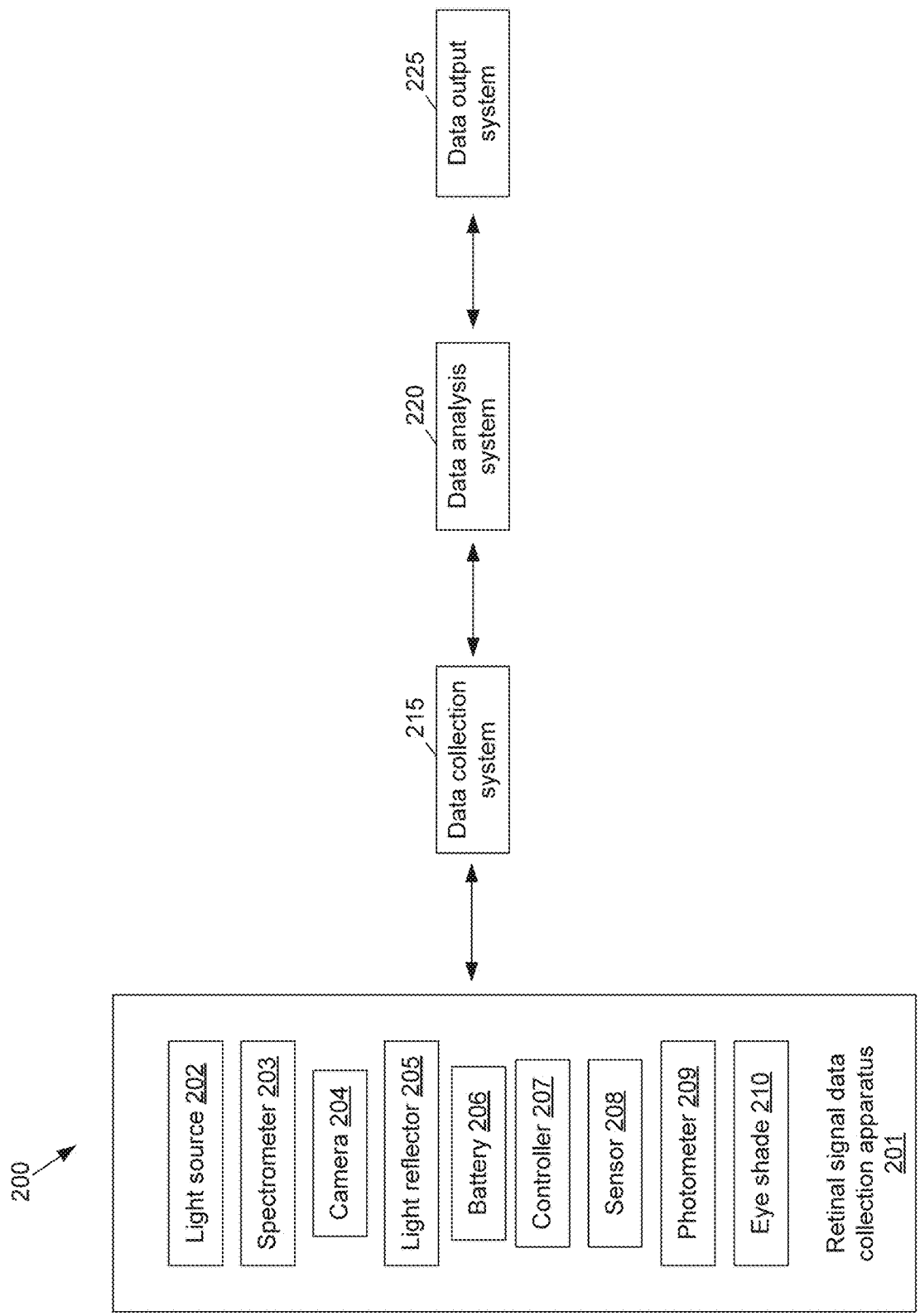
FIG. 2 is a block diagram of a retinal signal data processing system in accordance with various embodiments of the present technology.

FIG. 2 is a block diagram of a retinal signal data processing system 200 in accordance with various embodiments of the present technology. The retinal signal data processing system 200 may collect retinal signal data from an individual. As described above, when compared with conventional ERG, the retinal signal data captured using the retinal signal data processing system 200 may comprise additional features and/or data, such as light intensity, light spectrum, timing of the flash of light, duration of the flash of light, pupil size, shape, and area that is exposed to the flash of light, impedance, a higher measurement frequency, an extended range of retinal light stimulation, and/or a longer measurement time. The retinal signal data processing system 200 may process and/or analyse the collected data. The retinal signal data processing system 200 may output retinal signal data after detecting and/or removing artifacts from the retinal signal data, such as distortions or interferences. The retinal signal data processing system 200 may output retinal signal data after correcting for differences between the desired parameters of the light stimulation and the measured parameters of the light stimulation.

It is to be expressly understood that the system 200 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The retinal signal data processing system 200 may comprise a retinal signal data collection apparatus 201. FIGS. 6-24, described in further detail below, illustrate examples of retinal signal data collection apparatus. The retinal signal data collection apparatus 201 may collect retinal signal data from an individual. The retinal signal data may be associated with one eye or both eyes of the individual and in this respect, the retinal signal data collection apparatus may be configured for single eye or double eye use. In the illustrated embodiments, the retinal signal data collection apparatus is configured for double eye use. The retinal signal data collection apparatus 201 may include a housing supporting one or more of: a light source 202, a spectrometer 203, a camera 204, a light reflector 205, a power source such as the battery 206, a controller 207, a sensor 208, and/or a photometer 209.

The retinal signal data collection apparatus 201 for single eye use may be considered to have a single sub-system comprising the light source 202, the spectrometer 203, the camera 204, and the light reflector 205. The retinal signal data collection apparatus 201 for double eye use may be considered to have two such sub-systems, one for each eye.

The housing may be of any appropriate form for retinal signal collection. For example, the housing may have a hand-held form and be configured to be held close to or over the eye of the individual, either by the individual or by another person. In other embodiments, the housing may have a wearable form and be configured for hands-free use by the individual.

The retinal signal data collection apparatus 201 may contain any number of light sources 202. The light sources 202 may be any kind of light source or sources which, alone or in combination, can generate light within a specified range of wavelength, intensity, frequency and/or duration. The light sources 202 may be capable of generating a flash of light. The light sources 202 may include light-emitting diodes (LEDs), Xenon lamps, and/or any other type of light source. The light sources 202 may generate the flash of light based on pre-determined parameters, which may include a time for the flash of light, a length of time of the flash of light, a wavelength of the flash of light (i.e. a spectrum of the flash of light), an intensity of the flash of light, and/or any other parameters of the flash of light. The light sources 202 may be controlled by the controller 207. The controller 207 may trigger the light sources 202 to generate the flash of light with the pre-determined parameters. The controller 207 may comprise a processor, such as the processor 110 of the computing environment, or a dedicated control circuit.

The light sources 202 may be configured to provide a light stimulation signal to the retina of an individual. The retinal signal data collected may depend upon the light stimulation conditions. In order to maximise the potential to collect relevant additional information in the retinal signal data, the light sources 202 may be instructed to provide a large variety of light conditions. The light sources 202 may be configurable to control the background light and/or the stimulation light directed onto the retina as light flashes.

The light sources 202 may generate flashes of light of different wavelengths (e.g. from about 300 to about 800 nanometers), light intensity (e.g. from about 0.001 to about 3000 cd·s/m$^2$), light pulse frequency (e.g. from about 0.001 Hz to 600 Hz), illumination time (e.g. from about 1 to about 1000 milliseconds), time between each light flash (e.g. about 0.2 to about 50 seconds) with different background light wavelength (e.g. from about 300 to about 800 nanometers) and background light intensity (e.g. about 0.001 to about 900 cd/m$^2$). In certain embodiments, the light sources 202 are configured to generate a flash of light having a light intensity of more than about 30 cd·s/m$^2$, or about 50 to about 900 cd·s/m$^2$.

The retinal signal data collection apparatus 201 may contain any number of light reflectors 205. The light reflector 205 is configured to redirect light output by the light sources 202 into the individual's eye or eyes. The light reflector 205 may be a spheroidal light reflector. The light reflector 205 is configured to permit light beams from the light source 202 to exit, at a light outlet, the light reflector 205 towards the eye of the individual. At the light outlet of the light reflector 205, there may be further provided an eye shade 210 configured to contact an area around the eye of the individual and to permit transmission of the light beam to the eye whilst minimizing or avoiding ambient light entry into the eye shade. The light source 202 may be positioned inside the light reflector 205 such that the light is generated therein and directed to the eye of the individual. Alternatively, the light source 202 may be positioned externally of the light reflector 205, and transmitted therein via a light inlet. For single eye use, there may be provided a single spheroidal light reflector 205, a single set of light sources 202 and a single eye shade. For double eye use, there may be provided two separate spheroidal light reflectors 205, associated light sources 202 and eye shades, one for each eye.

The retinal signal data collection apparatus 201 may contain any number of spectrometers 203 and/or photometers 209. For example, for double eye use such as in the embodiments illustrated in the figures herein, the retinal signal data collection apparatus 201 may include two spectrometers 203 and/or photometers 209, one for each eye. Each spectrometer 203 and/or photometer 209 may measure parameters of the light generated by the light sources 202. The range of measurement of the spectrometer 203 and/or photometer 209 may include the range of intensity and wavelength spectrum of the light stimulation. The spectrometer 203 and/or photometer 209 may measure the intensity of the flash of light, the wavelength of the flash of light, the time when the flash of light began, the length of time of the flash of light, and/or any other information regarding the light sources 202. The data collected by the spectrometer 203 and/or photometer 209 may be stored. The data collected by the spectrometer 203 and/or photometer 209 may be used to calibrate a parameter of the light emitted by the light sources 202 and/or determine that the light sources 202 are malfunctioning, need to be readjusted or need to be replaced. If the pre-determined parameters of the flash of light do not match the measured parameters of the flash of light, aspects of the system 200 or the apparatus 201 may cause the signals sent to the light source 202 or the emitted light from the light source 202 to compensate for the measured differences. The spectrometer 203 may be coupled to the photometer 209, in embodiments containing the photometer 209.

In addition to or instead of the spectrometer 203 and/or photometer 209, the retinal signal data collection apparatus 201 may include one or more other devices to monitor and record light stimulation wavelength and/or light intensity. The light stimulation wavelength and/or light intensity may have an impact on the quantity of light stimulation reaching the retina and therefore triggering the retinal signal in response to this stimulus. The collected light stimulation wavelength and/or light intensity data may be included in the retinal signal data. The collected light stimulation wavelength and/or light intensity data may be used to adjust various values of the retinal signal data. These adjustments may be performed after collection of the retinal signal data and/or in real-time during collection of the retinal signal data.

The retinal signal data collection apparatus 201 may contain any number of cameras 204, such as one camera 204 for single eye use or two cameras 204, one for each eye. The camera may collect information about the individual and/or the flashes of light in the form of camera images and/or videos, for example. The camera 204 may capture an image of the individual's eye before the exposure to the flash of light, when the individual is exposed to the flash of light, and/or after the exposure to the flash of light. The camera images and/or videos may be used to determine timing information about the flash of light, such as when the flash began, the length of time of the flash, and/or any other information about the flash of light. The images and/or videos may be used to determine information about the individual exposed to the flash of light, such as pupil color, pupil size, pupil shape, pupil/eye position, and/or pupil area that is exposed to the flash of light for the eye. The images and/or videos may be used to determine and/or estimate an amount of light that enters the eye. The camera 204 may track pupil positioning, shape, and/or size, which may have an impact on the quantity of stimulation light reaching the retina and therefore affecting the electrical signals triggered in response to this stimulus. The eye position and/or pupil size/shape data may be included in the retinal signal data. This data may be used to adjust the retinal signal data during and/or after collection of the retinal signal data. The pupil size and/or the pupil shape are as determined when viewed from a fixed point relative to the eye. The fixed point in certain embodiments is from a position of the camera. By pupil shape is meant, for example, a deviation from a circular shape to an elliptical shape. The pupil shape may be defined in any convenient manner such as in terms of a widest diameter and a narrowest diameter. The terms eye position and pupil position may be used interchangeably; both terms refer to the position of the pupil in relation to a fixed point relative to the eye.

The images and/or videos from the camera may be used to determine a distance between the camera 204 and a point on the surface of the eye, such as a distance between the camera 204 and the iris of the eye. The images and/or videos may be used to determine a distance between the light sources 202 and a point on the surface of the eye, such as a distance between the light sources 202 and the iris of the eye. The distances may be calculated based on data in the image, such as a size of a part of the eye or a reflection in the eye. These distances may be stored and/or used to determine the position and/or the size of the retinal area that was exposed to the flashes of light.

The images and/or videos from the camera may be used to determine a pupil position of the eye and/or pupil size of the eye and/or a pupil shape of the eye. The pupil size may be determined by calculating an area of the pupil in the image. The pupil shape may be determined by identifying a height, width, and/or any other dimensions of the pupil.

The retinal signal data collection apparatus 201 may contain a power source such as any number of batteries 206. The batteries 206 may provide power to the components of the retinal signal data collection apparatus 201. Any suitable type of battery may be used for the batteries 206, such as a smart Li-Ion battery.

The retinal signal data collection apparatus 201 may contain any number of control circuits, such as the controller 207, for controlling one or more of the functions of the retinal signal data collection apparatus 201. There may be provided one controller 207 or two separate controllers 207 for controlling components of the retinal signal data collection apparatus 201 associated with different eyes of the individual. The controller 207 may include a main control card. The main control card may include a clock system for time-stamping data. The main control card may include a network interface such as a Wi-Fi interface for wireless communications. The main control card may include a battery control system to manage the batteries 206. The main control card may include a CPU. The main control card may control one or more of the functions of the retinal signal data collection apparatus 201. The main control card may control the light sources 202, such as via LED drivers. The main control card may perform temperature control functions to monitor and/or avoid overheating components of the retinal signal data collection apparatus 201.

Figure 10:
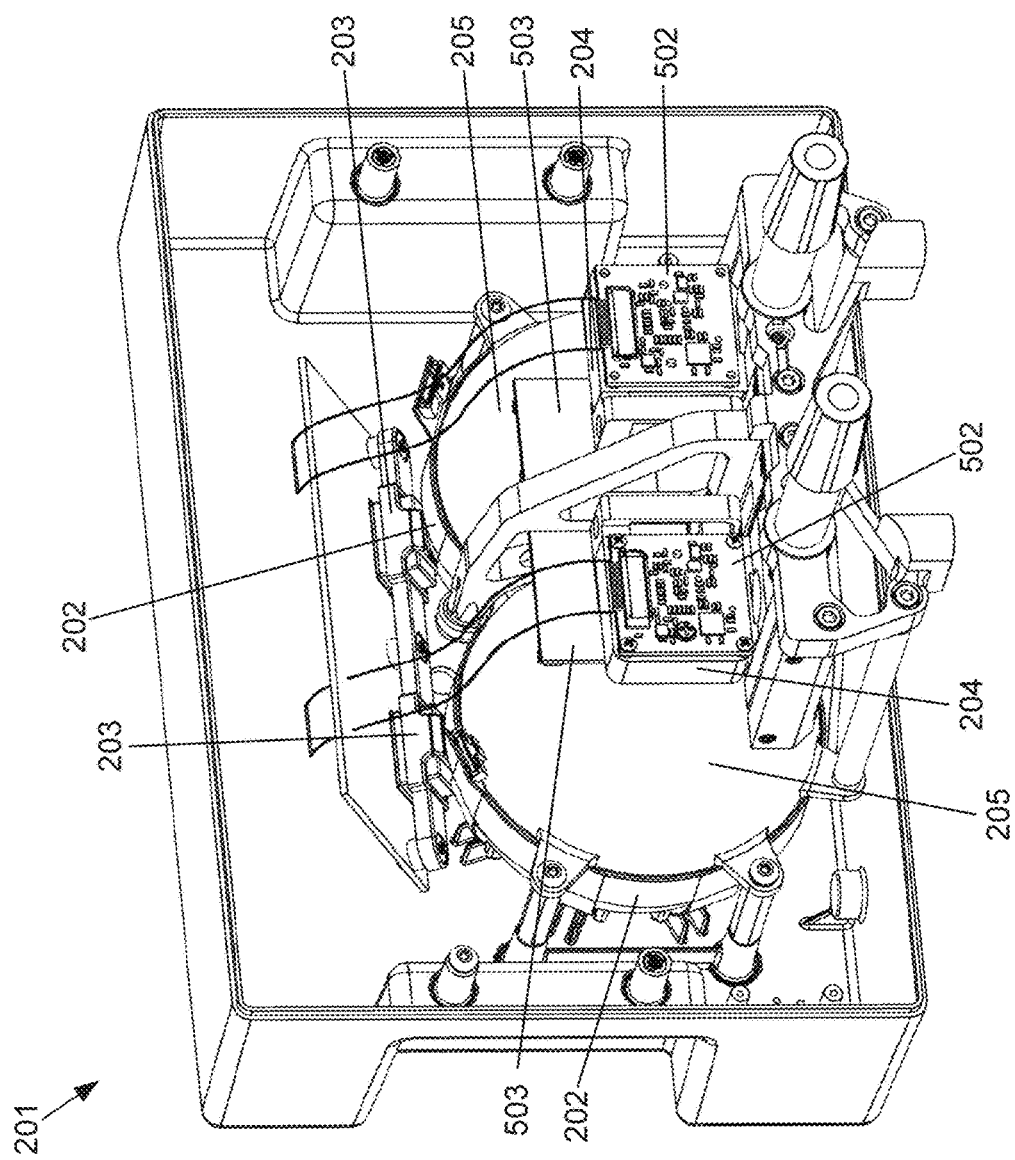
FIG. 10 illustrates optical components and electronic components of the apparatus for collecting retinal signal data in accordance with various embodiments of the present technology.

The controller 207 may include an infrared (IR) and fixation LED control circuit. The IR and fixation LED card may control a fixation LED and/or an infrared LED that may be detected by the camera 204. The controller 207 may include a spectrometer card. The spectrometer card may interface with the spectrometer 203. The spectrometer card may control the spectrometer 203 and/or receive data from the spectrometer 203. The spectrometer card may receive data indicating the light spectrum, the light frequency pulse and/or the intensity of the flashes of light. The individual may be instructed to focus their eye or eyes on the light output by the fixation LED. In this respect, the fixation LED may be configured to position the individual's eye in a predetermined orientation relative to one or more components of the retinal signal data collection apparatus 201, such as the camera 204. The fixation LED and/or camera 204 may be aligned with the light source 202 and/or the light reflector 205. An axis of the camera 204 may be coaxial with the aperture of the light reflector 205. As can be seen in FIG. 10, the camera 204 may be centered with respect to the light reflector 205. In the illustrated embodiments, the camera 204 is aligned with the light source 202, but other alignments and configurations may be used. For example multiple cameras 204 may be used, each offset to either side of the aperture of the light reflector 205.

The controller 207 may include a retinal signal acquisition circuit. The retinal signal acquisition circuit may record and/or output electrical signals of the individual, such as the electrical signals generated in response to the flashes of light. The retinal signal acquisition circuit may contain programmable gain amplifiers, analog-to-digital converters, filters, and/or other electronic components used for measuring and/or processing the electrical signals of the individual. The retinal signal acquisition circuit may include temperature control, to ensure that the components of the retinal signal acquisition circuit do not overheat which may interfere with data collection. The retinal signal acquisition circuit may include components for signal protection and/or isolation, such as shielding. The retinal signal acquisition circuit may include adjustable filters.

Figure 25:
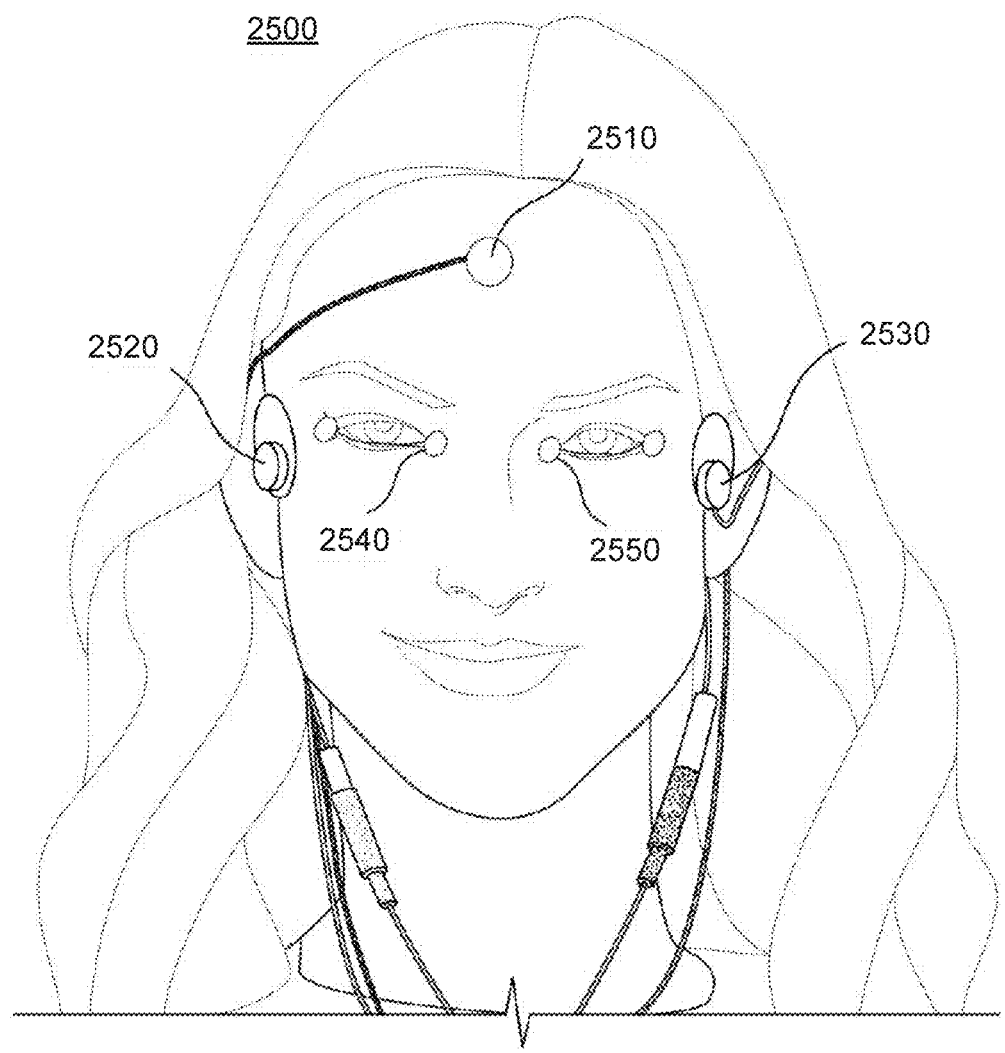
FIG. 25 illustrates an example of electrode placement on an individual in accordance with various embodiments of the present technology.

The retinal signal data acquisition circuit may receive data from one or more sensors 208. The sensors 208 may be arranged to detect electrical signals from the retina. The sensors 208 may comprise one or more electrodes. The sensors 208 may include an electroretinography sensor. FIG. 25, described below, illustrates an example of electrode placement on the individual. A ground electrode may be placed on the skin in the middle of the forehead. Active electrodes may be placed near the eyes or onto the eyes. Reference electrodes for each eye may be placed on the earlobes, temporal areas near the eyes, forehead, and/or other skin areas. The ground electrode may serve as the zero reference for the positive or negative polarity of the electrical signals. The ground electrode may be located at the center of the forehead, on top of the head, and/or on the wrist.

Some or all of the functions described as being performed by the controller 207 may be performed by a computing environment, such as the computing environment 100 integrated in the retinal signal data collection apparatus 201 or the computing environment 100 external to, and in communication with, the retinal signal data collection apparatus 201. The computing environment 100 in the retinal signal data collection apparatus 201 may include any number of processors, such as the processor 110. The light source 202, spectrometer 203, camera 204, controller 207, and/or sensor 208 may be connected to and/or in communication with the processors.

Electrical signals from the retina may be triggered by light stimulation from the light sources 202, collected by the sensors 208, and processed by the retinal signal data acquisition circuit as retinal signal data. The retinal signal data may be collected by the sensors 208, such as by an electrode positioned on the ocular globe or nearby ocular areas. Each flash of light may trigger an electrical signal generated by the retinal cells of the individual. Depending upon the nature of the light (e.g. intensity, wavelength, spectrum, frequency, pulse and duration of the flashes) and the conditions for the light stimulation (e.g. background light, dark or light adaptation of the individual subjected to this process), different electrical signals may be generated because different types of retinal cells will be triggered. This signal propagates within the eye and ultimately to the brain visual areas via the optic nerve. However, as any electrical signal, it propagates in all possible directions depending upon the conductivity of the tissues. Therefore the electrical signal may be collected in the tissues external to the ocular globe, accessible from outside, such as the eyelids, the sclera, the cornea or the conjunctiva.

There are several types of electrodes which can be used to collect the retinal electrical signals; they are based upon specific material, conductivity, and/or geometry. It should be understood that there are many possible designs of recording electrodes and that any suitable design or combination of designs may be used for the sensors 208. The sensors 208 may comprise e.g., contact lens, foil, wire, corneal wick, wire loops, microfibers, and/or skin electrodes. Each electrode type has its own recording characteristics and inherent artifacts.

The retinal signal data acquisition circuit may include pre-amplifiers, amplifiers, filters, analog-to-digital converters, and/or any other electrical signal processing devices. The electrical signals may be collected as a potential difference between an electrode (called 'active' electrode) placed in the region where the electrical signal is received from the retina (e.g. the cornea or the ocular globe) and an electrode placed nearby that location (called 'reference' electrode). The electric potential difference is often collected relative to an electrical neutral point relative to a ground electrode. Prior to being recorded, the electrical signals may pass through any number of pre-amplifiers, amplifiers, filters, analog-to-digital converters, and/or any other signal processing devices. The retinal signal data acquisition circuit may allow for amplification of the electrical signals and/or conversion of the electrical signals to digital signal for further processing. The retinal signal data acquisition circuit may implement frequency filtering processes that may be applied to the electrical signals from the sensors 208.

The retinal signal data acquisition circuit may record the impedance of the electrical circuit used to collect the retinal signal data. The impedance of the electrical circuit may be recorded simultaneously with the capture of other electrical signals. The collected impedance data may be stored in the retinal signal data. The method to determine the impedance of the circuit simultaneously with the capture of the electrical signals may be based upon a process of injecting a reference signal of known frequency and amplitude through the recording channel of the electrical signals. This reference signal may then be filtered out separately and processed. By measuring the magnitude of the output at the excitation signal frequency, the electrode impedance or the impedance of the circuit collecting the retinal signal may be calculated. Impedance may then be used as a co-variable to enhance signal density with the resistance of the circuit at each time point of the recording of the electrical signals.

The electrical signals may be obtained between the active electrode (positioned onto the eye or near the eye) and the reference electrode. The electrical signals may be obtained with or without differential recording from the ground electrode.

The retinal signal data collection apparatus 201 may contain and/or may be in communication with a data collection system 215, which may comprise a recording device. The data collection system 215 may store data describing the electrical signals in a database, such as in the format of voltage versus time points. The data collection system 215 may be part of the computing environment 100.

The data collection system 215 may be arranged to receive measured electrical signals of an individual, such as signals measured by the sensor 208 and processed by the controller 207 or the processor 110, parameters of the light source 202, measurements from the spectrometer 203, measurements from the photometer 209, image data from the camera 204, and/or other data from the controller 207, and store this collected data as retinal signal data. The data collection system 215 may record calibration data corresponding to a time period prior to a flash of light or a series of flashes of light, and retinal signal data corresponding to a time period during and/or after the flash of light or the series of flashes of light. The calibration data and the retinal signal data may have the same parameters and be collected by the same circuit.

The collected data may be provided to the data collection system 215 by the retinal signal data collection apparatus 201 via any suitable method, such as via a storage device (not shown) and/or a network. The data collection system 215 may be in communication with the retinal signal data collection apparatus 201 via a communication network. The communication network may be the Internet and/or an Intranet. Multiple embodiments of the communication network may be envisioned and will become apparent to the person skilled in the art of the present technology.

The retinal signal data may comprise electrical response data (e.g. voltage and circuit impedance) collected for several signal collection times (e.g. 5 to 500 milliseconds) at several sampling frequencies (e.g. 0.2 to 24 kHz) with the light stimulation synchronization time (time of flash) and/or offset (baseline voltage and impedance prior to light stimulation). The data collection system 215 may collect retinal signal data at frequencies (i.e. sampling rate) of 4 to 16 kHz, or higher. This frequency may be higher than conventional ERG. The electrical response data may be collected continuously or intermittently.

The retinal signal data may comprise impedance measurements and/or other electrical parameters. The retinal signal data may comprise optical parameters such as pupil size changes, retinal area illuminated, and/or applied luminance parameters (intensity, wavelength, frequency of light, duration of light pulse, frequency of signal sampling). The retinal signal data may comprise population parameters such as age, gender, iris pigmentation, retinal pigmentation, and/or skin pigmentation as a proxy for retinal pigmentation, etc. The retinal signal data may comprise admittance, conductance, and/or susceptance data. The retinal signal data may comprise one or more of images, videos, and/or any other image data collected by the camera 204.

The data analysis system 220 may process the retinal signal data stored by the data collection system 215. The data analysis system 220 may extract retinal signal patterns and/or descriptors from the retinal signal data, and/or perform any other processing on the retinal signal data. The data analysis system 220 may be part of the computing environment 100.

The data output system 225 may output data stored by the data collection system 215. The data output system 225 may output results generated by the data analysis system 220. The data output system 225 may output predictions, such as the predicted likelihood that an individual is subject to one or more conditions, such as a mental condition. For each condition, the output may indicate the predicted likelihood that the individual is subject to that condition. The output may be used by a clinician to aid in determining whether an individual is subject to a medical condition and/or determining which medical condition the individual is subject to.

The data collection system 215, data analysis system 220, and/or data output system 225 may be accessed by one or more users, such as through their respective clinics and/or through a server (not depicted). The data collection system 215, data analysis system 220 and/or data output system 225 may also be connected to retinal signal data management software which could further extract retinal signal information or patterns of information and analyse embedded biosignatures and/or biomarkers. The data collection system 215, data analysis system 220, and/or data output system 225 may be connected to appointment management software which could schedule appointments or follow-ups based on the determination of the condition by embodiments of the system 200.

The data collection system 215, data analysis system 220, and/or data output system 225 may be distributed amongst multiple systems and/or combined within a system or multiple systems. The data collection system 215, data analysis system 220, and/or data output system 225 may be geographically distributed. Although described here as forming the retinal signal data processing system 200, the retinal signal data collection apparatus 201, data collection system 215, data analysis system 220, and/or data output system 225 may each be operated independently of the retinal signal data processing system 200.

Impact of Eye Rotation on Stimulated Retinal Area

Figure 3:
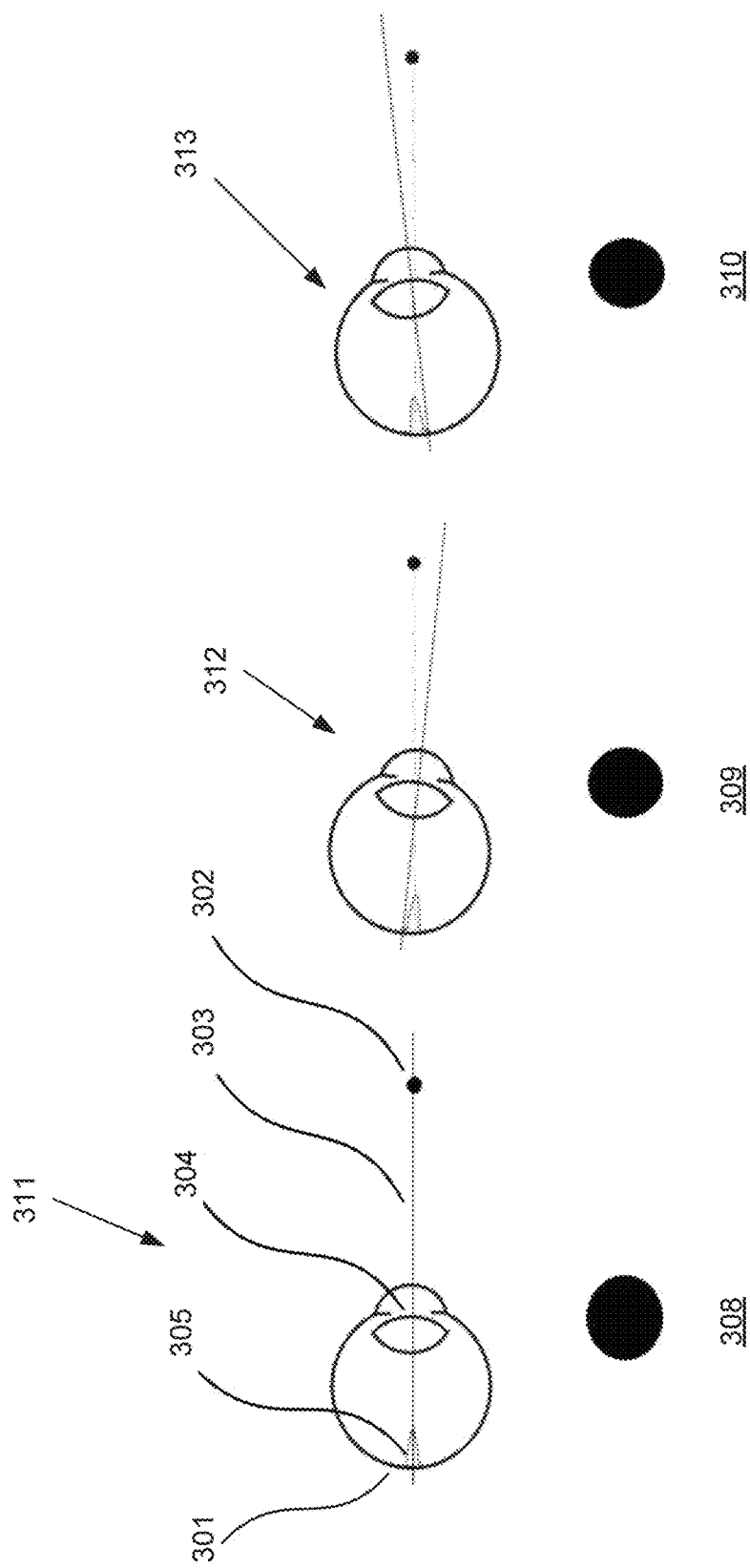
FIG. 3 illustrates the impact of eye rotation on the retinal area stimulated by a light beam.

To stimulate the retina and generate the retinal signal, fixed light sources 202 are used in the light reflectors 205. Each eye is stimulated simultaneously but independently. FIG. 3 illustrates the impact of eye rotation on the retinal area stimulated by a fixed light beam. The optical axis 303 of the eye is a theoretical construct where the surfaces of the cornea and the lens are rotationally symmetric, and their centers of curvature lie on a common line. The visual axis of the eye is the line connecting the point of fixation to the fovea, the region of the retina where the visual acuity is the highest. The pupil 304 is the opening in the iris that allows the light to enter the eye. The iris is the colored portion of the eye that surrounds the pupil and can control the size of the pupil to allow the appropriate amount of light to enter the eye. The lens, located behind the iris, refracts the light to focus images on the retina 301. For a fixed illumination point, both the area of the pupil and the shape of the pupil determine the amount of light entering into the eye. For a fixed point of illumination 302 (light source), and a viewing point, the position of an individual's pupil affects the shape of that pupil. As the eye moves, the pupil shape changes from a round shape when centered on the optical axis, to an oval shape when off-centre from the optical axis, from that viewing point. As mentioned earlier, the shape of the pupil can be defined in terms of its maximum/minimum diameter or radius from a central point.

The retina 301 is the light-sensitive region which covers the entire back internal portion of the eye. The photoreceptors, rods and cones, are specialized retinal cells that respond to light. In addition to having different visual functions, the rods and cones are also distributed across the retina in different densities. This difference in cell density leads to non-uniform light stimulation sensitivity onto the retina, therefore different retinal signal generated depending upon which area of the retina is stimulated. Other retinal cells, such as bipolar and ganglion cells, respond to light stimulus in specific areas of the retina. The resulting retinal signal is therefore different depending upon the location and the size of the receptive fields stimulated onto the retina. The area of the pupil 304 at the time of the light stimulation may impact the amount of light reaching the retina 301. The size of the pupil area may be determined in order to determine the amount of light reaching the retina 301. The position and/or movement of the eye in relation to the optical axis at the time of the light stimulation may be determined. This position may be used to determine the area of the retina which is illuminated by the light stimulation.

For a fixed light source 302, the optical axis 303 determines the direction of the light entering the eye through the pupil 304, and the retinal area illuminated resulting in a point spread function of illumination 305. Example 311 illustrates the light source 302 centered on the optical axis 303. In this case, the iris 308 is a round aperture. In the example 312, the light beam is not centered with the optical axis because of the eye movement (rotation), causing the iris 309 to be an oval aperture rather than round. Similarly, in the example 312, the light source is not centered with the optical axis because of the eye movement (rotation), causing the iris 310 to be an oval aperture rather than round. As the shape of the iris changes, the location and the shape of the area of the retina which is illuminated by a fixed light source also changes.

The position of the light source 302 with relation to the optical axis 303 and/or position of the pupil may be recorded to determine the area of the retina that is illuminated by the light stimulation.

Figure 4A:
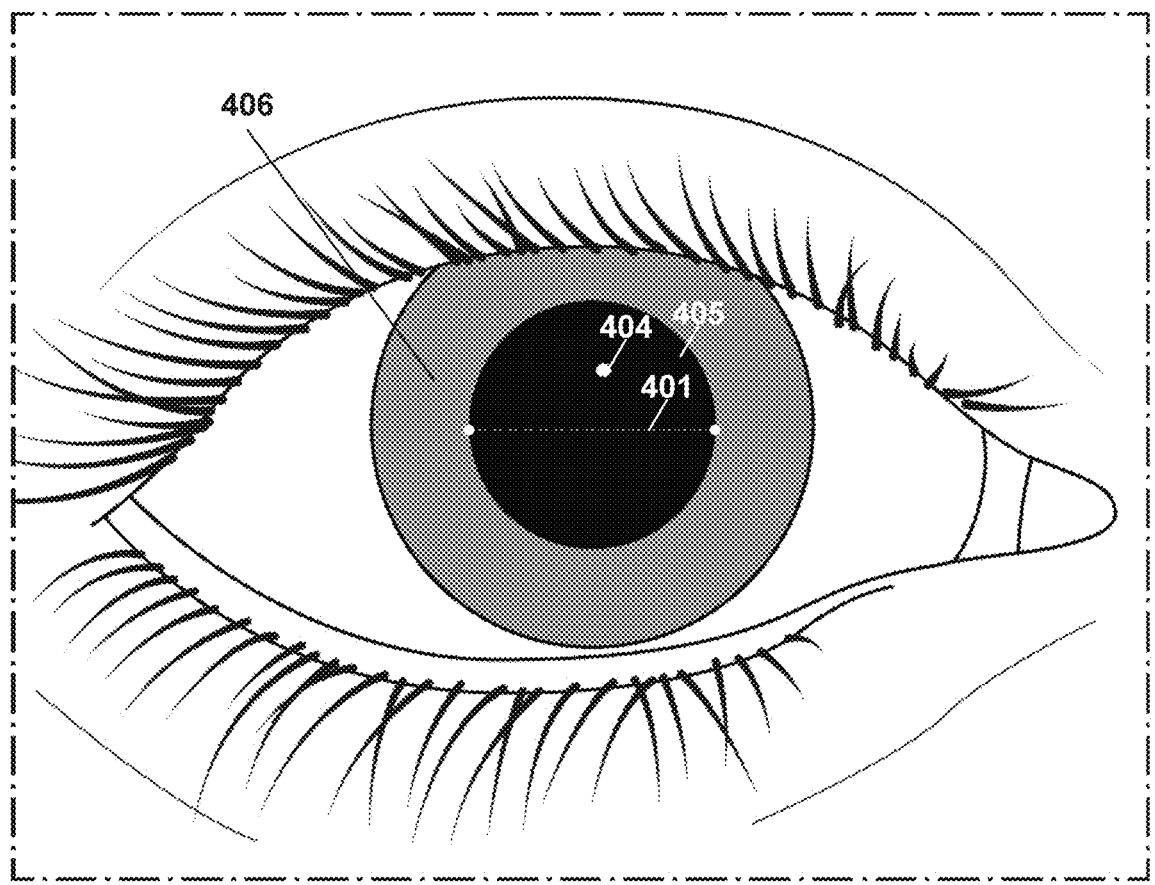
FIGS. 4A and 4B illustrate two photos of an eye and the impact of eye rotation on the pupil area and shape.
Figure 4B:
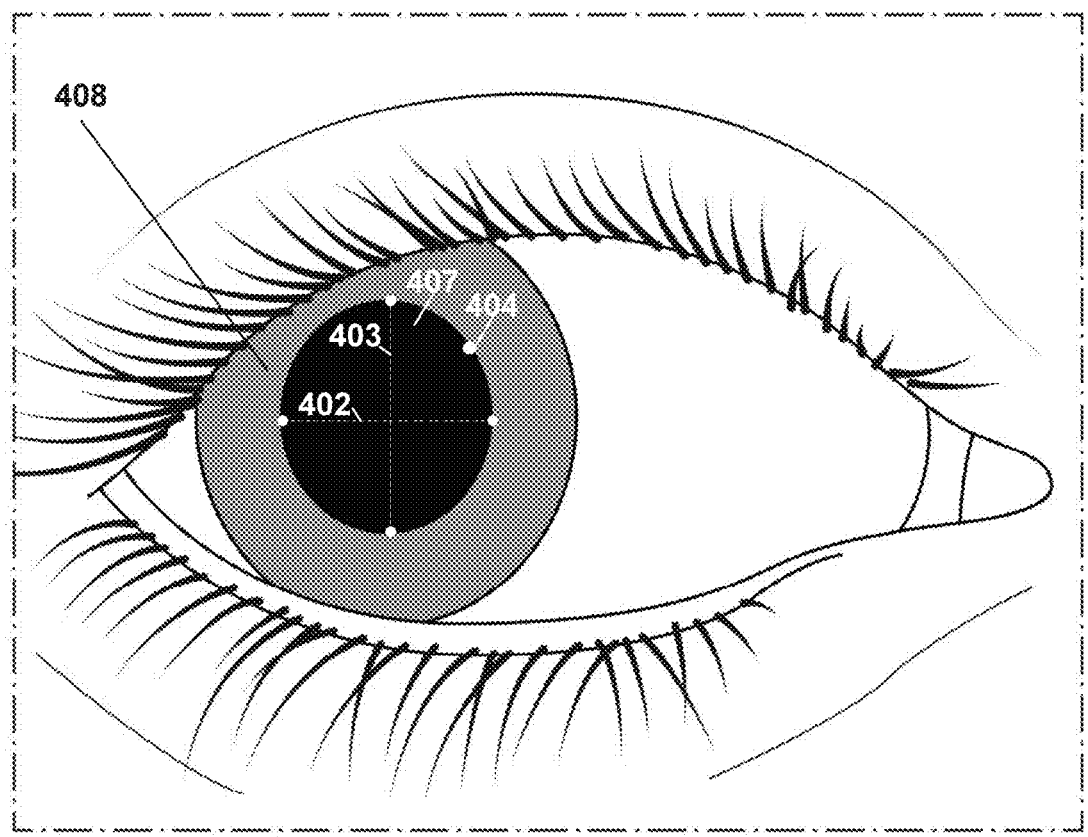

FIGS. 4A and 4B illustrate two photos of an eye taken with one version of the described apparatus, and the impact of eye rotation on the pupil area and shape. The photos are taken from a fixed location. FIG. 4A shows the photo of the eye when the gaze is centered on a fixed point that matches the visual axis. The fixed point may be a fixation light that the individual is instructed to focus on. A reflection 404 of the fixation light can be seen in FIGS. 4A and 4B. The iris 406 and pupil 405 can be seen in FIG. 4A. Similarly, in FIG. 4B, the iris 408 and pupil 407 can be seen. The pupil 405 of the eye in FIG. 4A has a round shape (a circle with a diameter 401). FIG. 4B shows the photo of the eye when the gaze is off-centre. The pupil 407 has an oval shape in FIG. 4B. The oval shape can be defined by a minimum diameter 402 and a maximum diameter 403.

Figure 5:
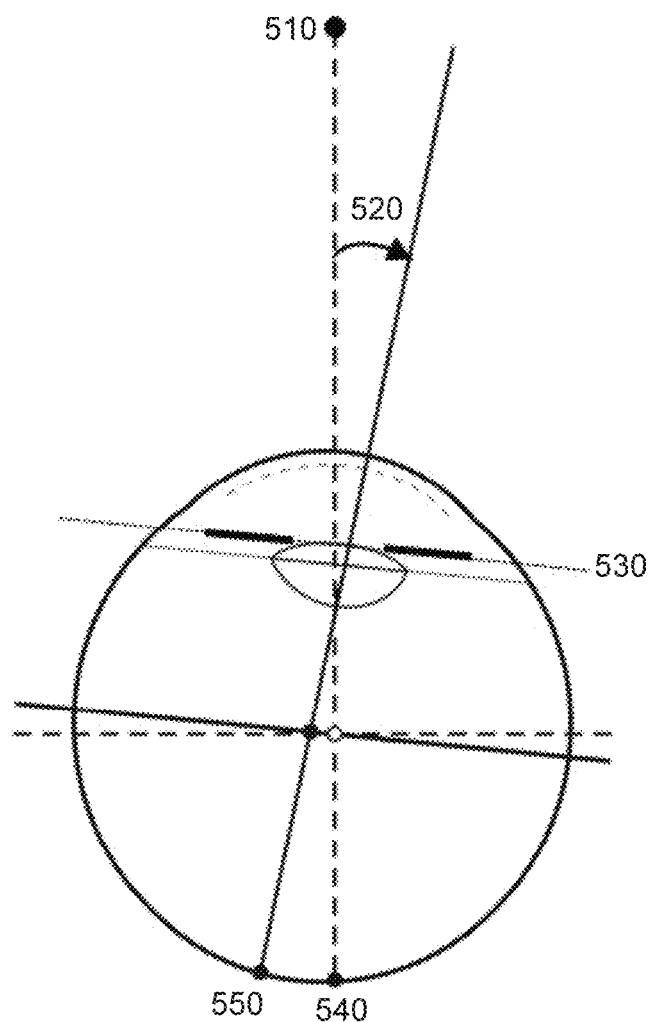
FIG. 5 illustrates the impact of eye rotation in both the change in pupil area plane determining the angle with the shape of the pupil, and the point of projection of the light beam onto the retina.

FIG. 5 illustrates the impact of eye rotation in both the change in pupil area plane, determining the angle with the shape of the pupil, and the point of projection of the light beam onto the retina. For a fixed point of illumination 510, any rotation 520 of the eye will induce a rotation in the iris plane 530 and a change in the point of projection of the light beam onto the retina, in this example, from 550 to 540. Moreover, any rotation 520 will also induce a change in the shape of the iris, from round shape to oval shape, as depicted in FIGS. 3, 4A, and 4B. Any change in the shape of the iris will induce a reduction of the retinal area impacted by the light beam. The shape and the area of the pupil may be determined by the camera 204. The distance from the fixed light beam and the eye are determined by design of the apparatus. The dimensions of the ocular system have been extensively published to allow simple geometrical calculation for the determination of the conic projection of the light beam and the point of illumination onto the retina (Artal, Advances in Optics and Photonics, 2014, 6: 340-367; Jóźwik et al, Journal of Vision, 2021, 21(3):6, 1-9; Atchison and Smith, Optics of the Human Eye, Elsevier Science Ltd, 2000). The shape and the area of the pupil may be used to determine the angle of eye rotation. For a fixed light stimulation, the angle of eye rotation may be used to determine the point of illumination onto the retina. The shape and the area of the pupil are variables to be considered in analysing the retinal signal, since impacting on the location and area of the light stimulation triggering the retinal signal.

Retinal Signal Data Collection System

Figure 6:
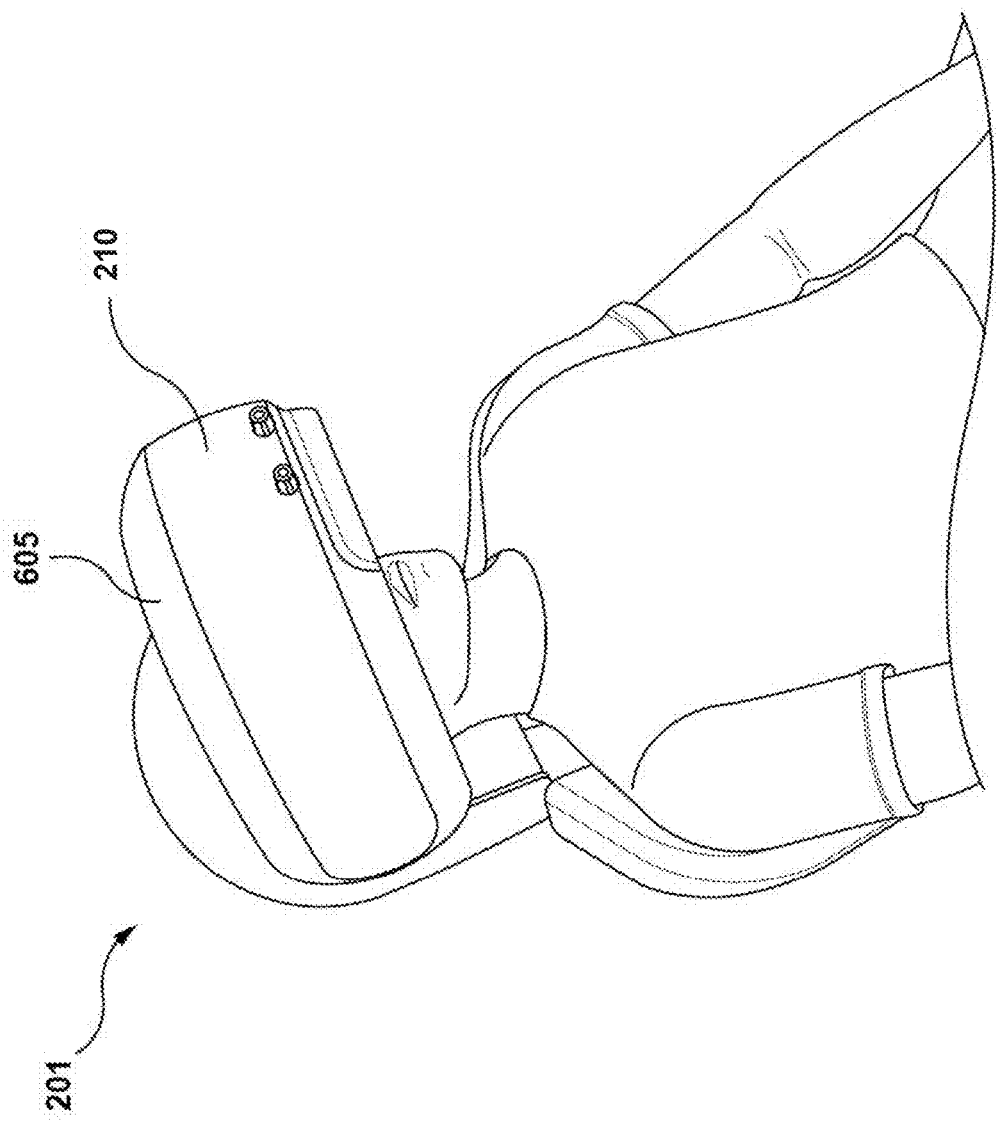
FIG. 6 illustrates an apparatus for collecting retinal signal data in accordance with various embodiments of the present technology.

FIG. 6 illustrates the apparatus 201 for collecting retinal signal data in accordance with various embodiments of the present technology. As illustrated in FIG. 6, the apparatus 201 may have a wearable configuration and an individual may wear the apparatus 201 during retinal light stimulation and electric signal collection. The apparatus 201 includes a housing 605 that supports various components of the apparatus therein and is configured to go over the individual's head. The housing 605 may be in the form of a helmet. The housing 605 of the apparatus 201 may include an eye shade 210. The eye shade 210 may block out most or all external light from entering the housing and/or the individual's eyes.

Figure 7:
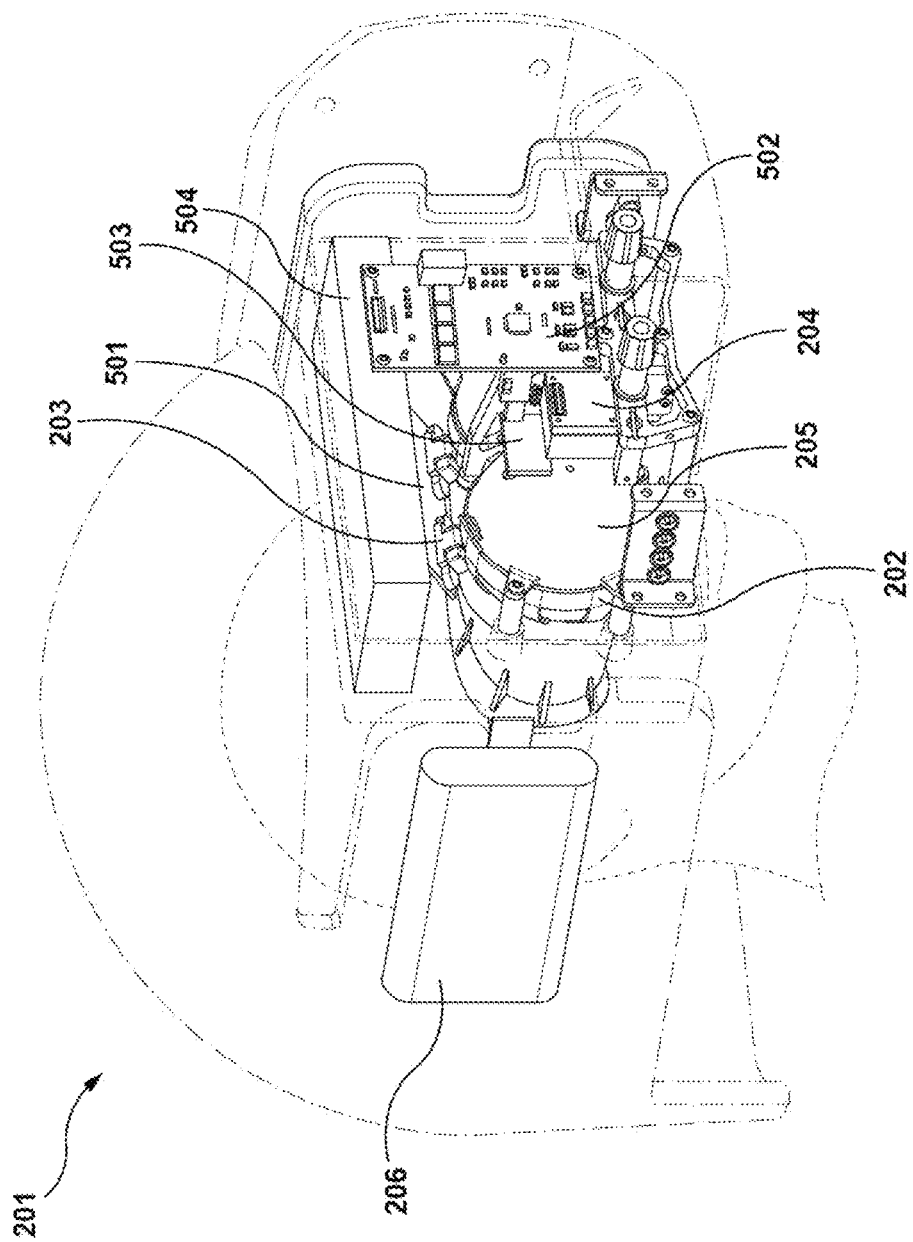
FIG. 7 illustrates components of the apparatus for collecting retinal signal data in accordance with various embodiments of the present technology.

FIG. 7 illustrates components of the apparatus 201 for collecting retinal signal data in accordance with various embodiments of the present technology. The apparatus 201 comprises the battery 206, light sources 202, light reflectors 205, cameras 204, and the spectrometer 203. Additionally, the apparatus 201 includes a spectrometer control circuit 501, a retinal signal data acquisition circuit 502, an IR and fixation LED circuit 503, and a main control circuit 504. As can be seen, the apparatus 201 includes two sub-systems, one for each eye. Each sub-system comprises one light reflector 205 which is spheroidal, light sources 202 attached to the light reflector and configured to emit light beams into the light reflector, the camera 204 configured to capture image and/or video data associated with the eye, and the spectrometer 203 configured to detect parameters associated with the emitted light beam.

It should be understood that FIG. 7 illustrates an exemplary arrangement of components of the apparatus 201, and that the components may be arranged in any other suitable arrangement.

Figure 8:
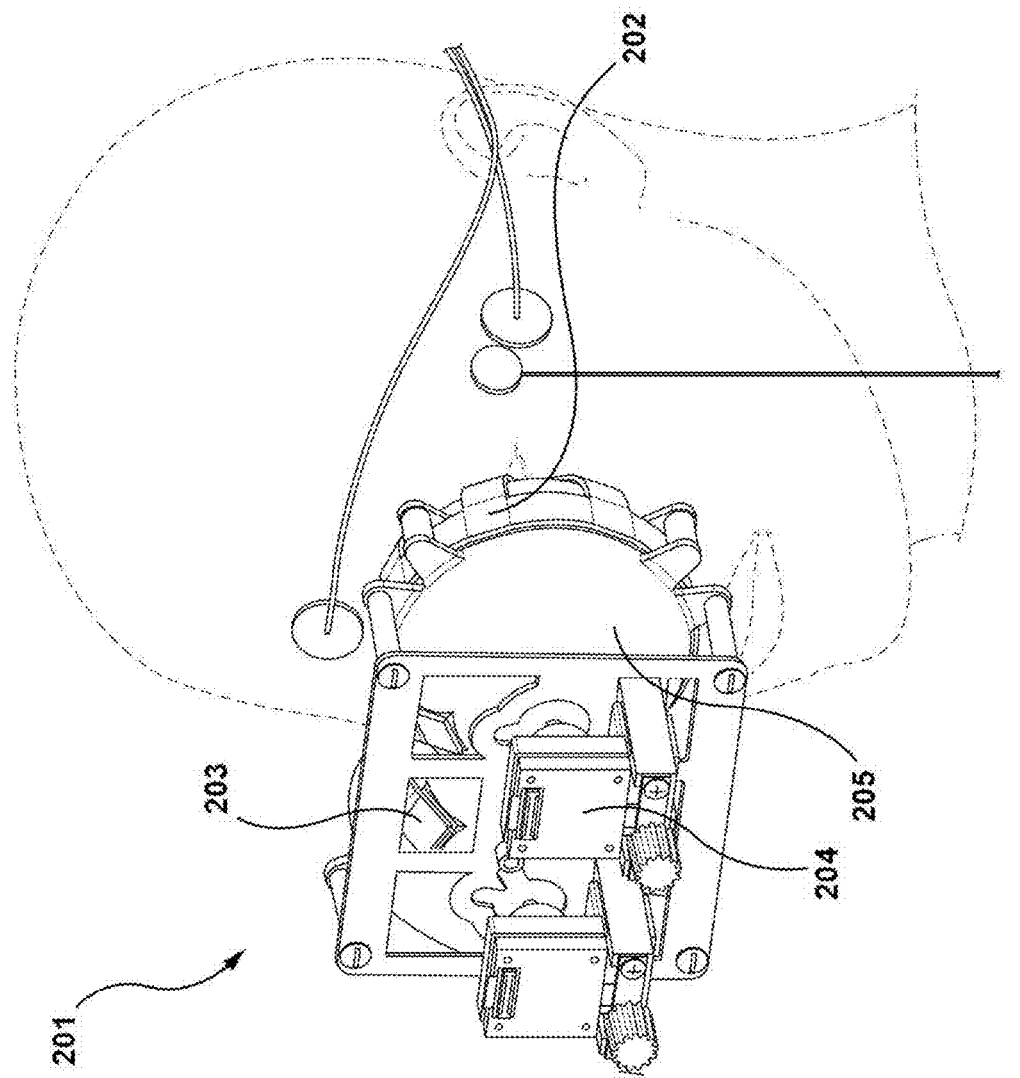
FIG. 8 illustrates a second view of components of the apparatus for collecting retinal signal data in accordance with various embodiments of the present technology.

FIG. 8 illustrates a second view of components of the apparatus 201 for collecting retinal signal data in accordance with various embodiments of the present technology.

Figure 9:
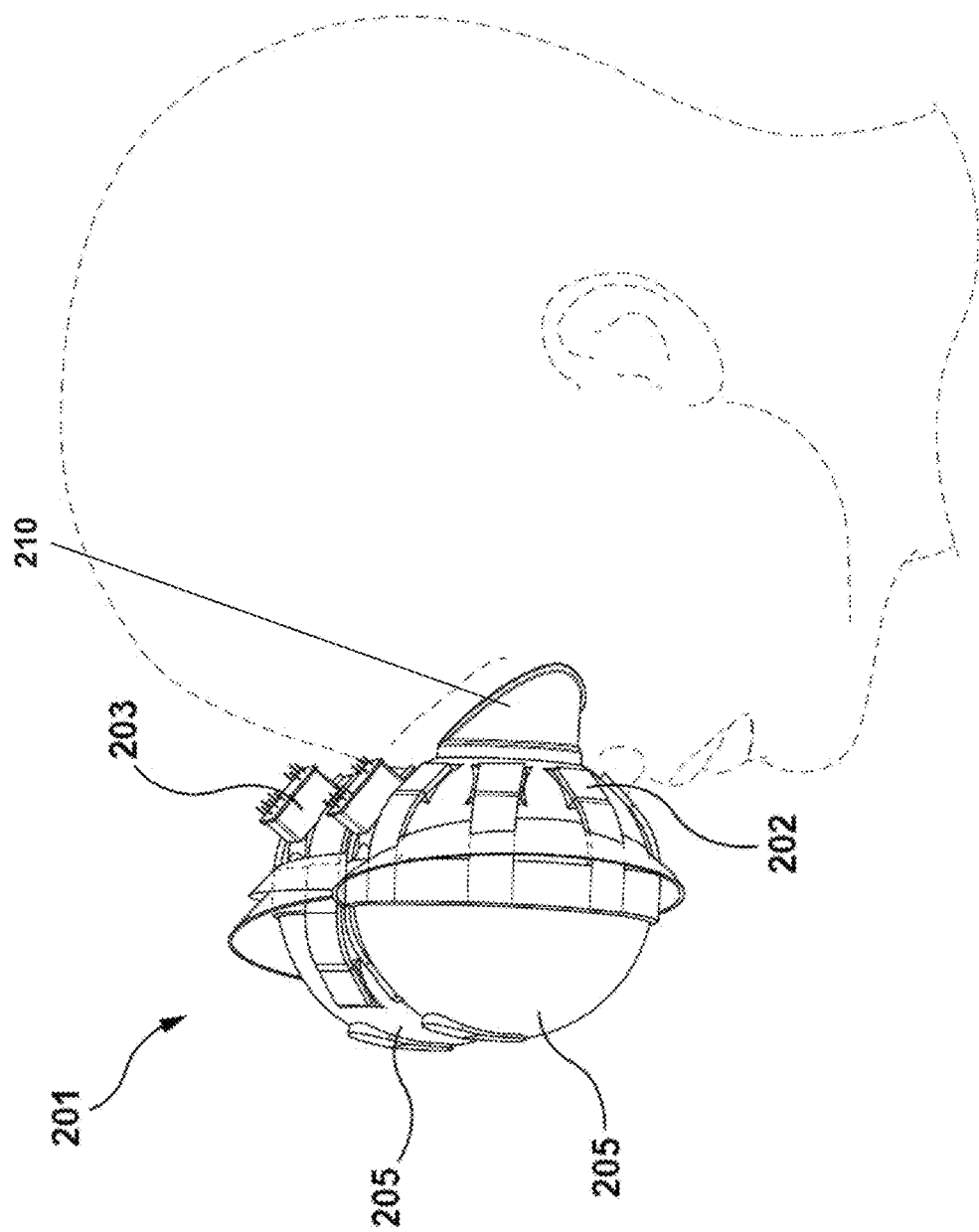
FIG. 9 illustrates a third view of components of the apparatus for collecting retinal signal data in accordance with various embodiments of the present technology.

FIG. 9 illustrates a third view of components of the apparatus 201 for collecting retinal signal data in accordance with various embodiments of the present technology.

FIG. 10 illustrates optical components and electronic components of the apparatus 201 for collecting retinal signal data in accordance with various embodiments of the present technology.

Figure 11:
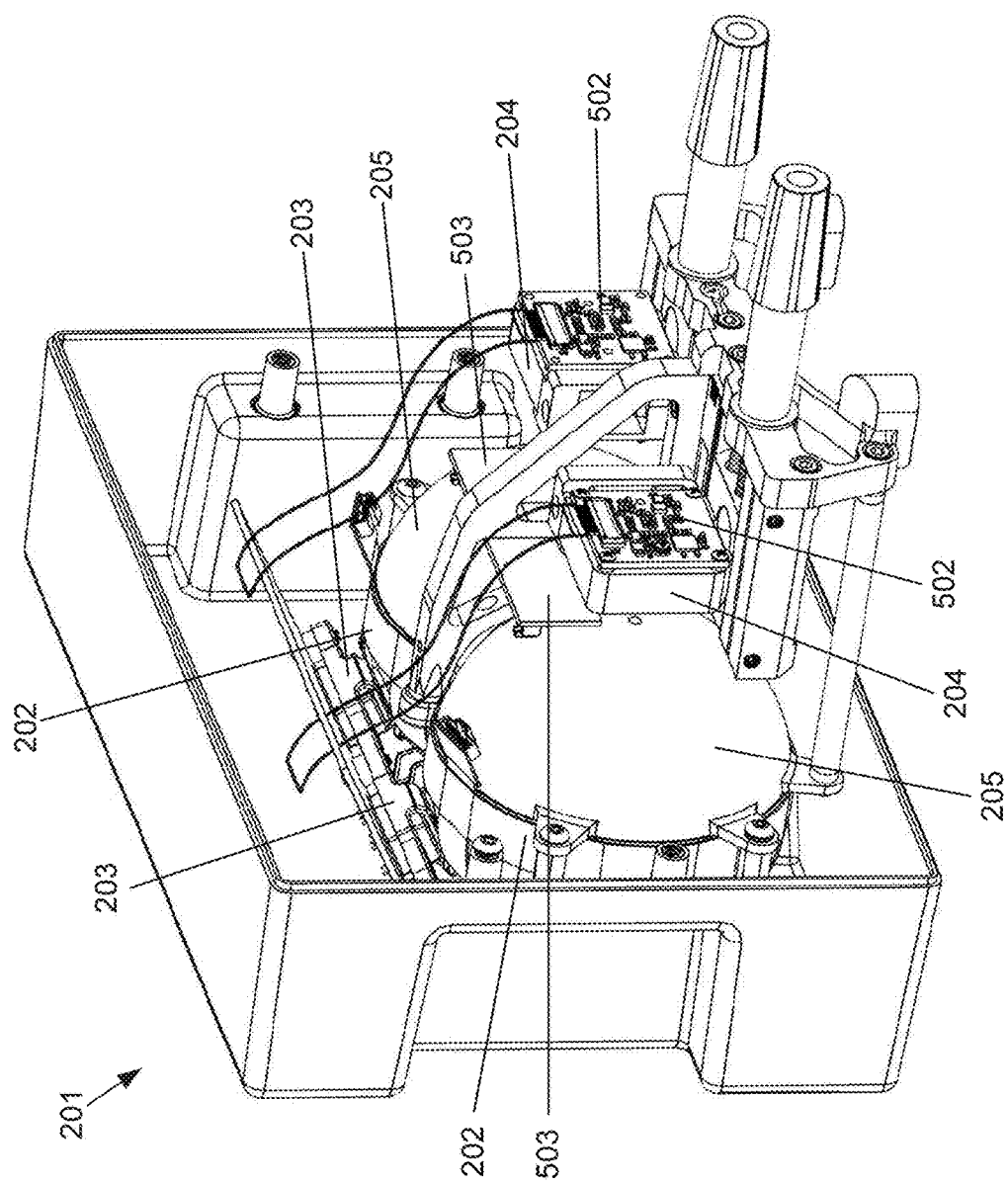
FIG. 11 illustrates a second view of the optical components and electronic components of the apparatus for collecting retinal signal data in accordance with various embodiments of the present technology.

FIG. 11 illustrates a second view of the optical components and electronic components of the apparatus 201 for collecting retinal signal data in accordance with various embodiments of the present technology.

Figure 12:
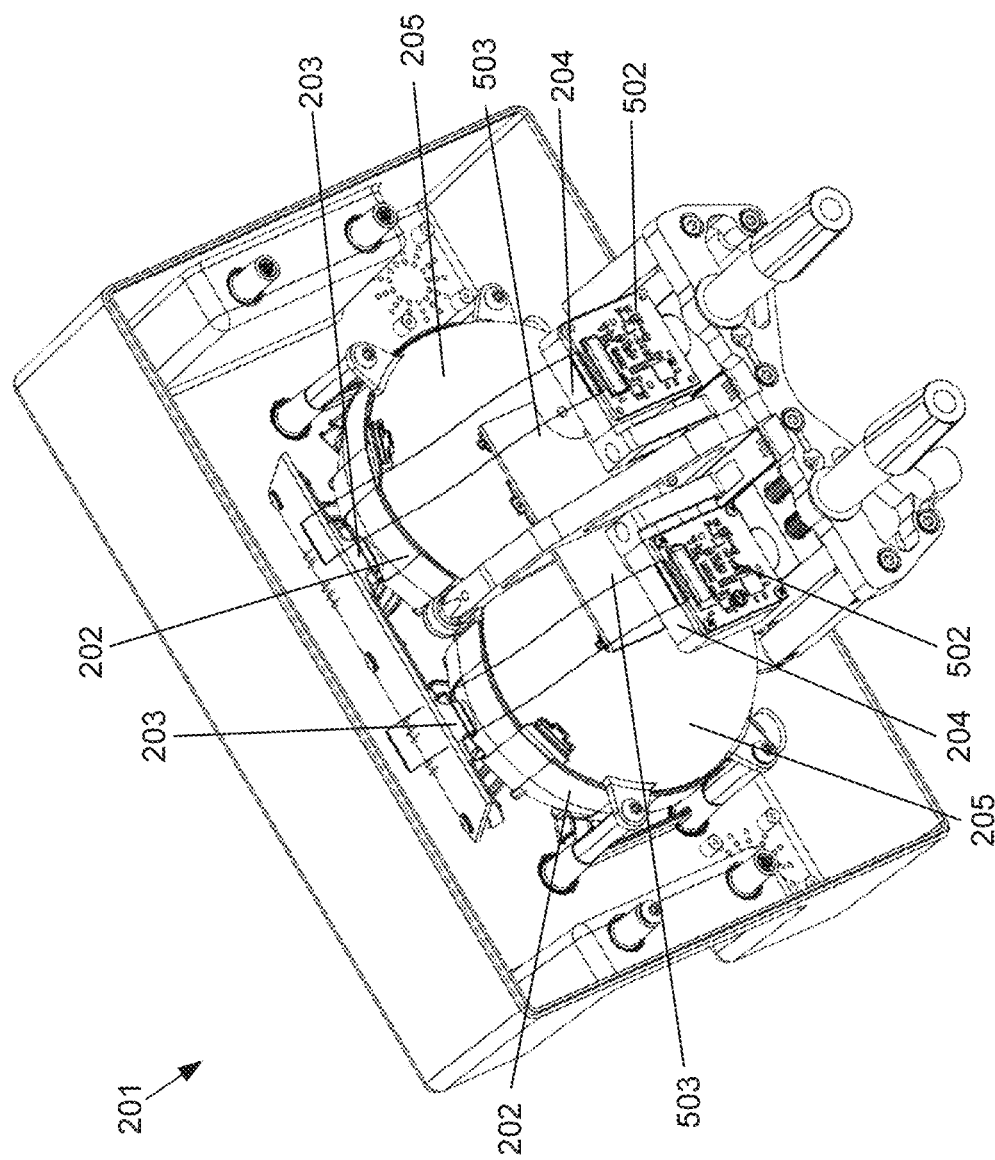
FIG. 12 illustrates a third view of the optical components and electronic components of the apparatus for collecting retinal signal data in accordance with various embodiments of the present technology.
Figure 13:
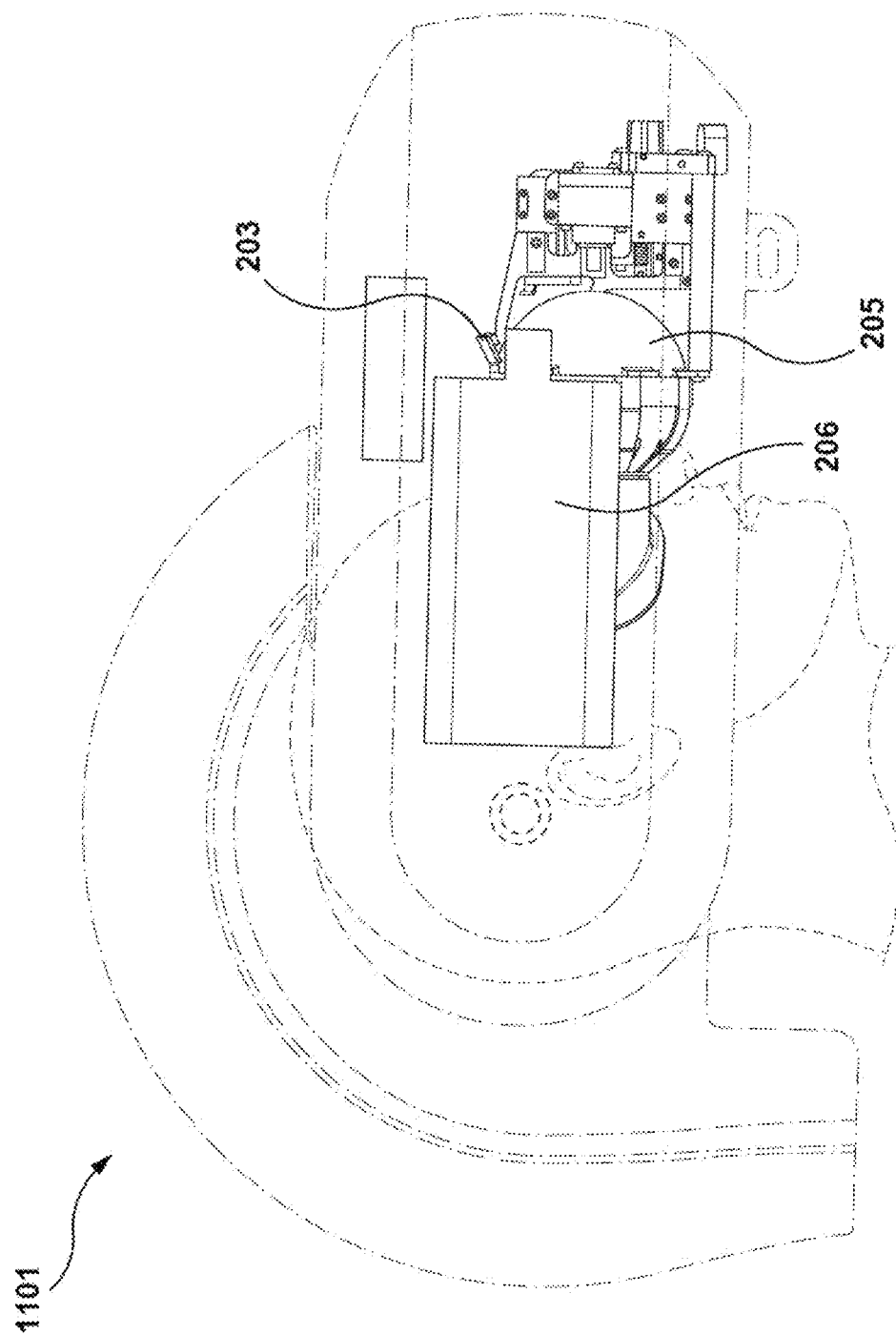
FIG. 13 illustrates a helmet positioned on the head of an individual for collecting retinal signal data in accordance with various embodiments of the present technology.

FIG. 12 illustrates a third view of the optical components and electronic components of the apparatus 201 for collecting retinal signal data in accordance with various embodiments of the present technology FIG. 13 illustrates a helmet 1101 positioned on the head of an individual for collecting retinal signal data in accordance with various embodiments of the present technology. The helmet 1101 may contain the apparatus 201 for collecting retinal signal data or some components of the apparatus 201. The helmet 1101 may be worn by an individual in order to collect retinal signal data of the individual.

Figure 14:
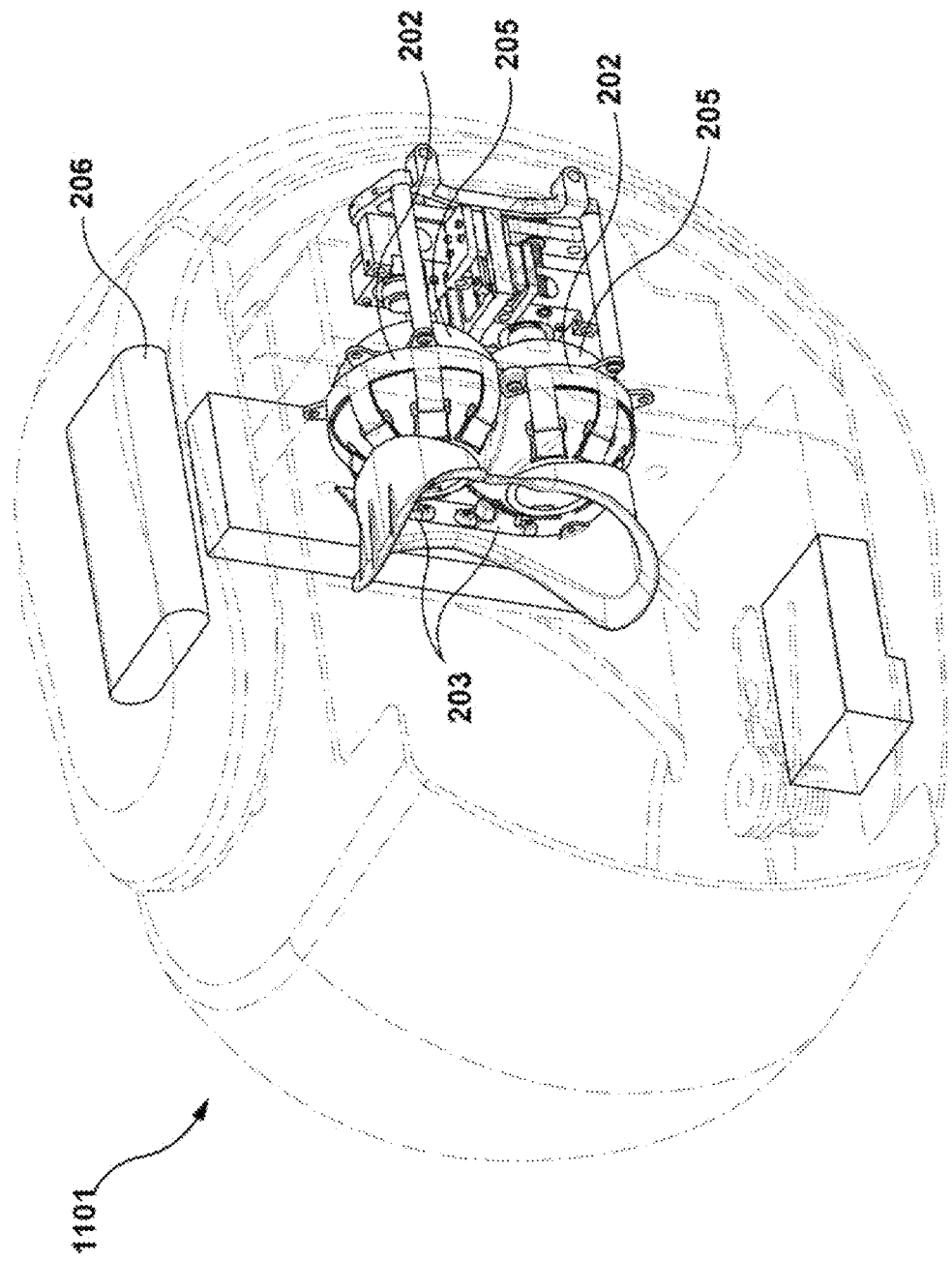
FIG. 14 illustrates components of the helmet in accordance with various embodiments of the present technology.

FIG. 14 illustrates components of the helmet 1101 in accordance with various embodiments of the present technology. The helmet 1101 may contain one or more batteries 206, one or more light sources 202, one or more spectrometers 203, one or more light reflectors 205, and/or any other elements of the apparatus 201.

Figure 15:
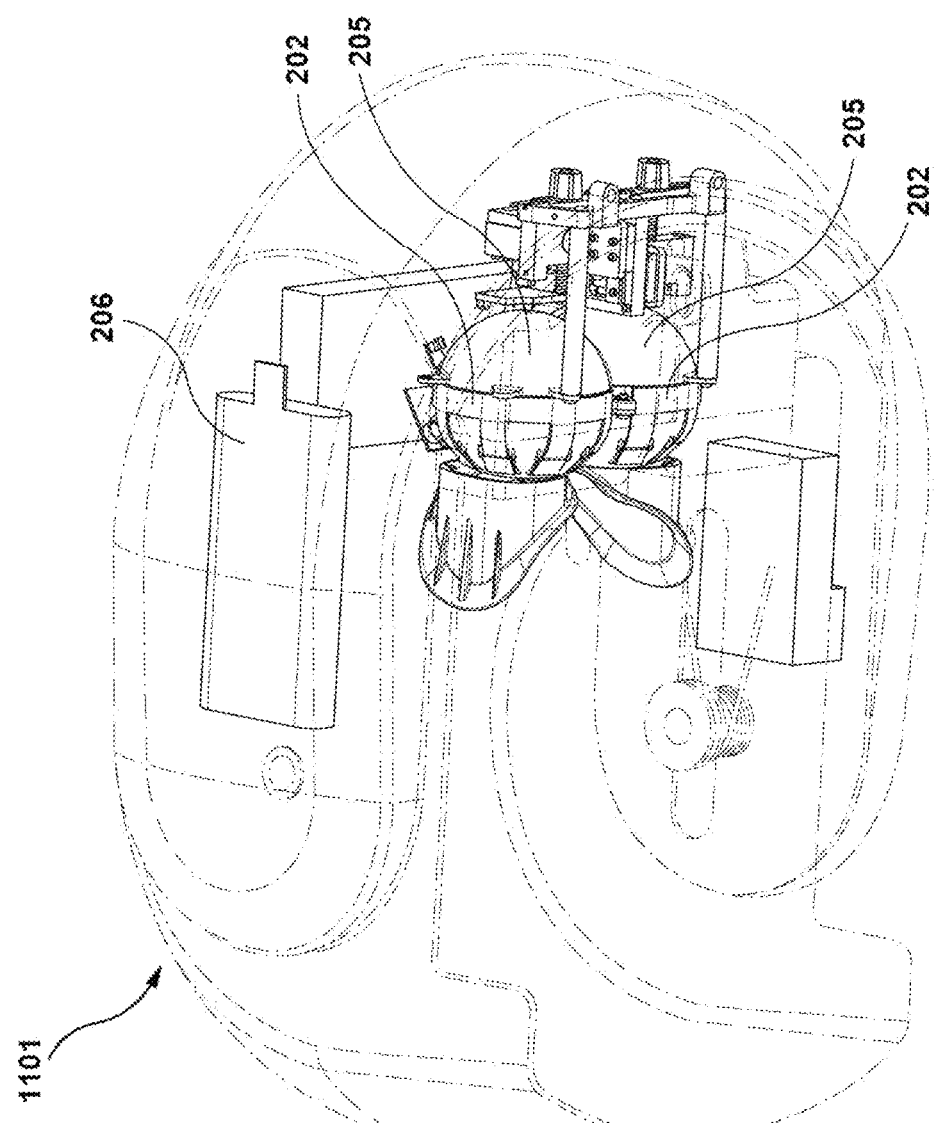
FIG. 15 illustrates a second view of the components of the helmet in accordance with various embodiments of the present technology.
Figure 16:
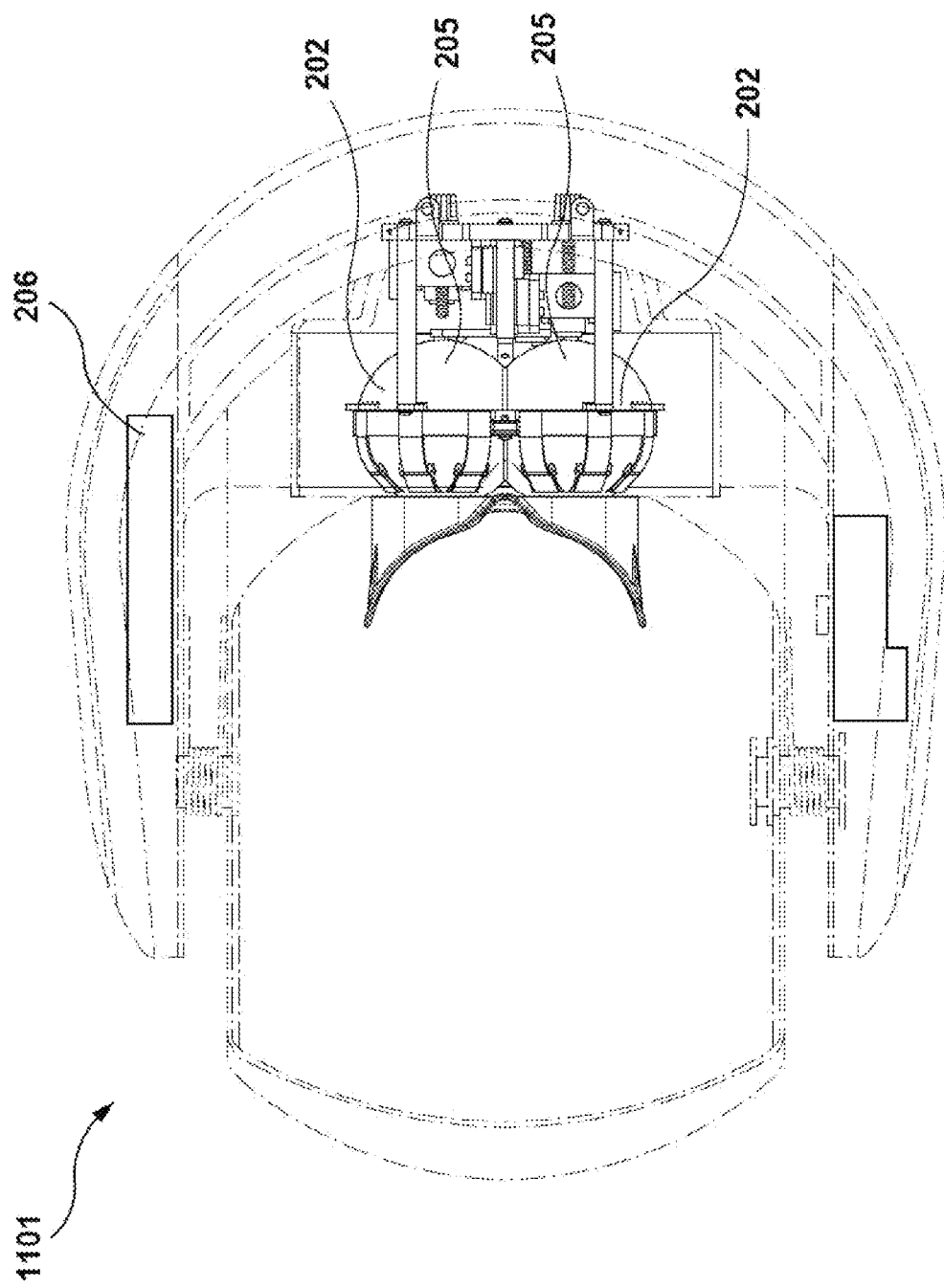
FIG. 16 illustrates a third view of the components of the helmet in accordance with various embodiments of the present technology.

FIG. 15 illustrates a second view of the components of the helmet 1101 in accordance with various embodiments of the present technology. FIG. 16 illustrates a third view of the components of the helmet 1101 in accordance with various embodiments of the present technology.

Figure 17:
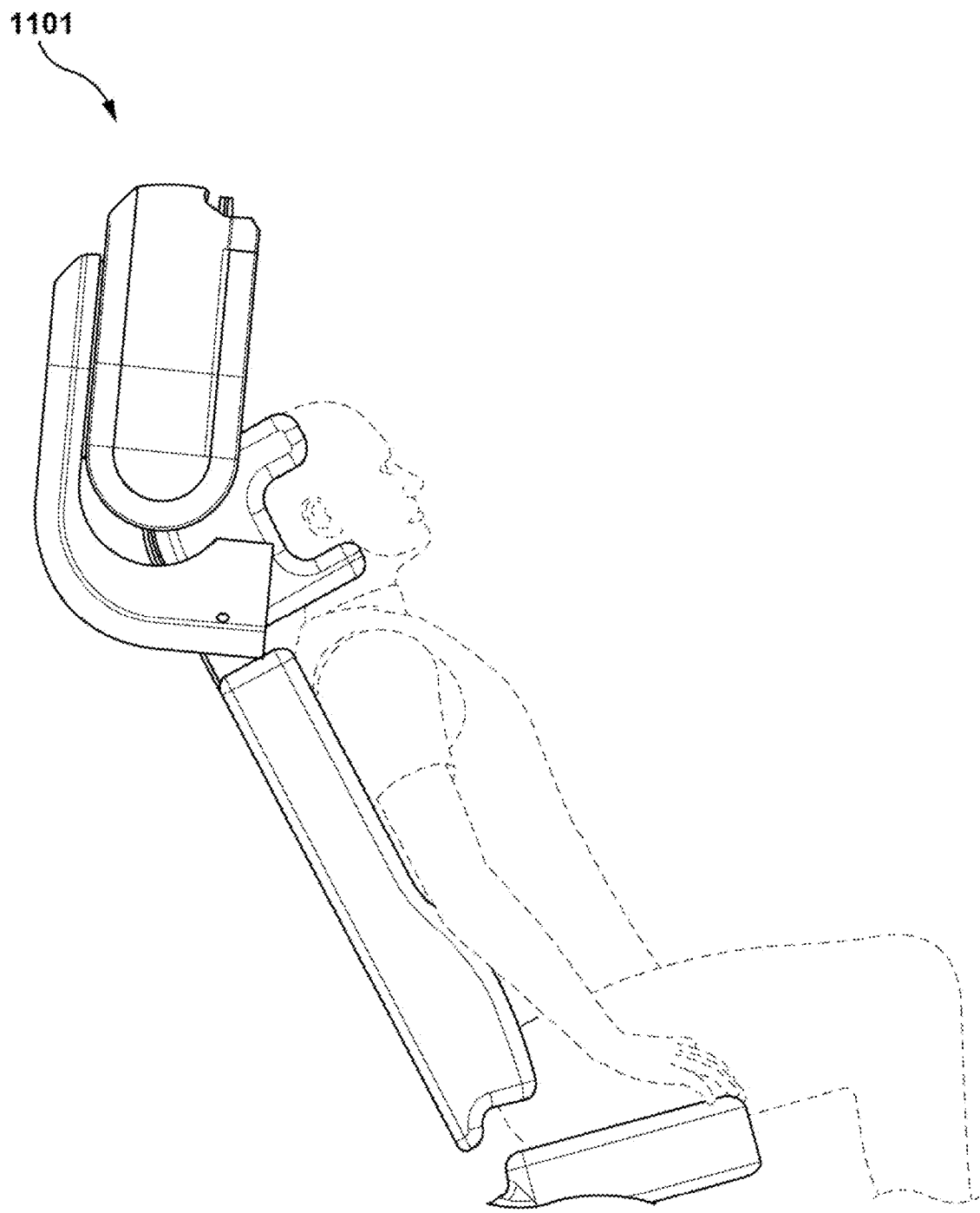
FIG. 17 illustrates the helmet attached to a seat in accordance with various embodiments of the present technology.

FIG. 17 illustrates the helmet 1101 attached to a seat in accordance with various embodiments of the present technology. The helmet 1101 may be rotatably mounted to the seat. The helmet 1101 may be rotated, raised, and/or lowered to fit over the head of the individual in the seat.

Figure 18:
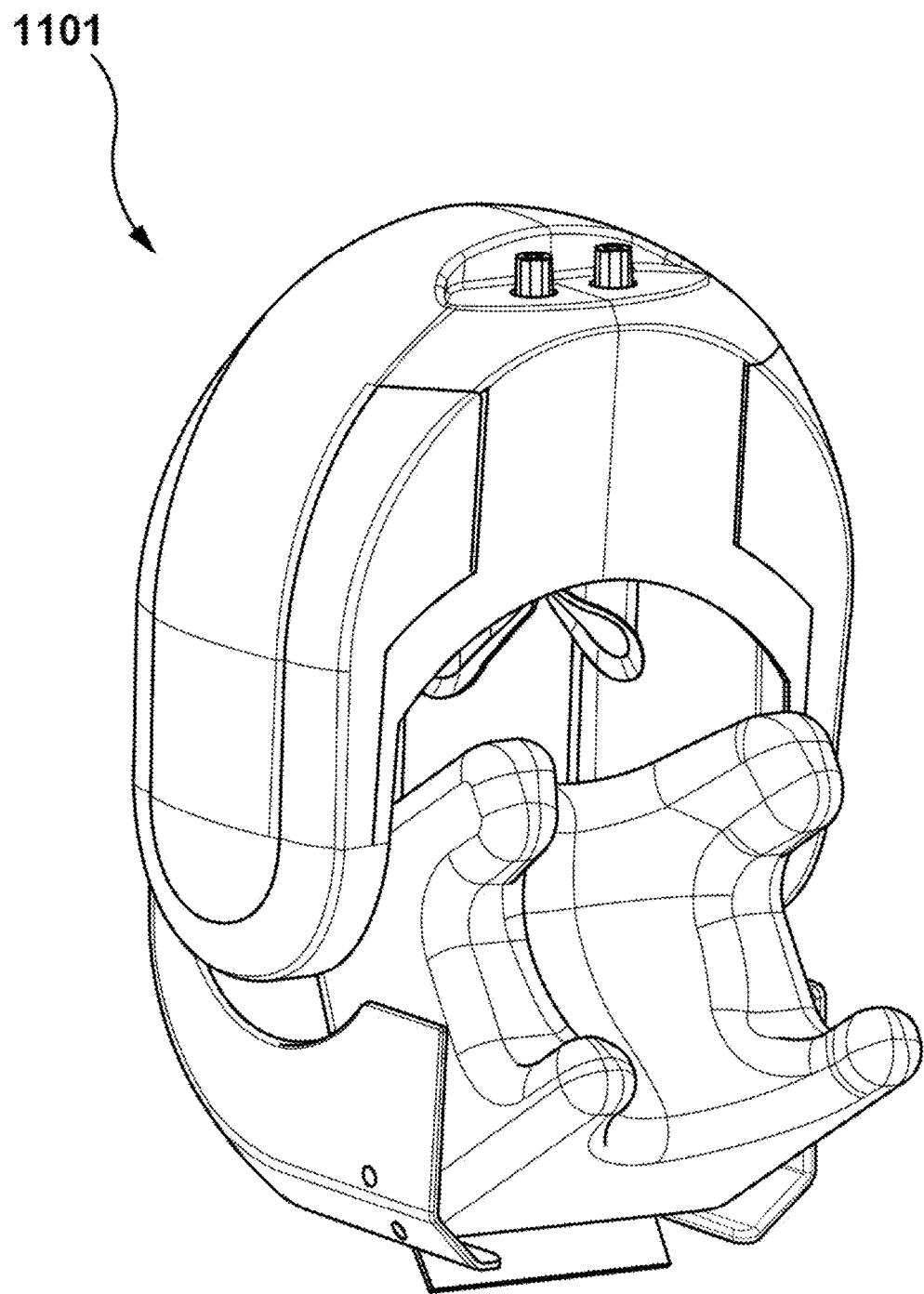
FIG. 18 illustrates another view of the helmet in accordance with various embodiments of the present technology.

FIG. 18 illustrates another view of the helmet 1101 in accordance with various embodiments of the present technology.

Figure 19:
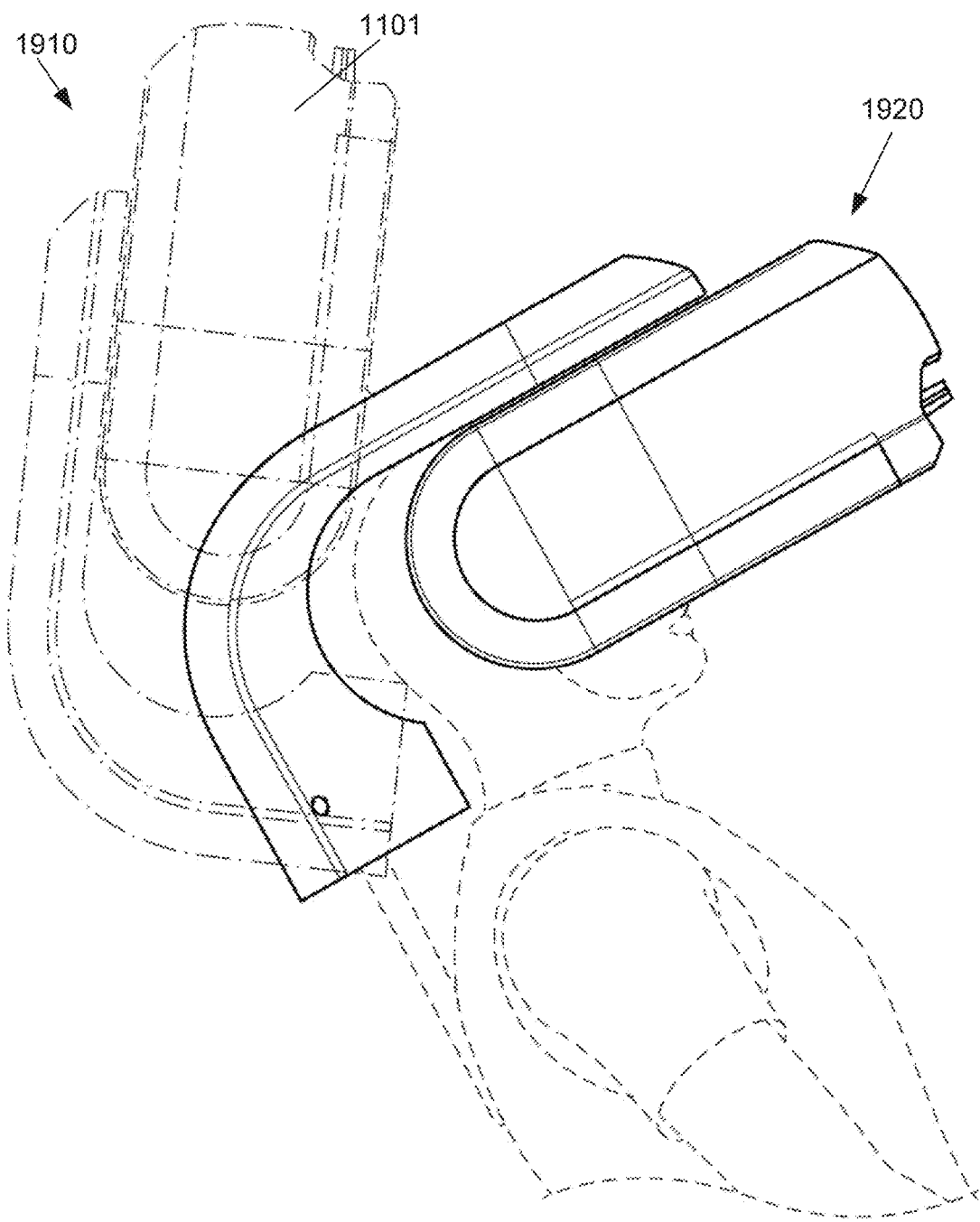
FIG. 19 illustrates the helmet being adjusted to align the head of an individual with the optical and electronic components of the system for collecting retinal signal data in accordance with various embodiments of the present technology.

FIG. 19 illustrates the helmet 1101 being adjusted to align the head of an individual with the optical and electronic components of the system for collecting retinal signal data in accordance with various embodiments of the present technology. The helmet 1101 may be rotatably mounted to a chair. At a first position 1910, the helmet 1101 may be in a raised configuration. Prior to the individual sitting in the seat, the helmet 1101 may be positioned in the first position 1910.

After the individual sits in the seat, the helmet 1101 may be rotated to the second position 1920. The helmet 1101 may be rotated until the components of the helmet 1101 are properly aligned with the individual at the second position 1920. After aligning the helmet 1101 with the individual, the helmet 1101 may be locked at the second position 1920. Then, while locked at the second position 1920, the helmet 1101 may be used to collect retinal signal data from the individual.

Figure 20:
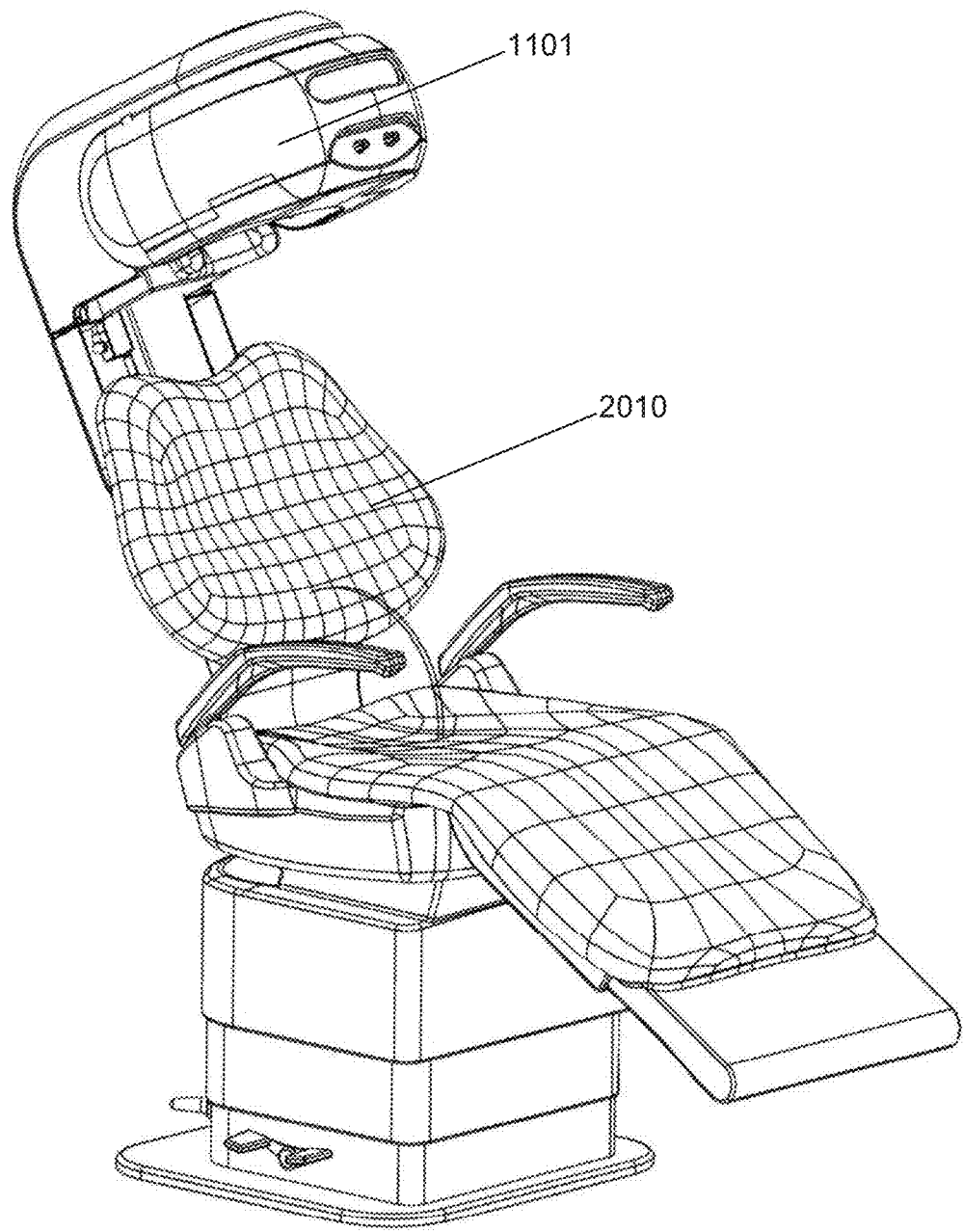
FIG. 20 illustrates the helmet attached to a medical chair in accordance with various embodiments of the present technology.
Figure 21:
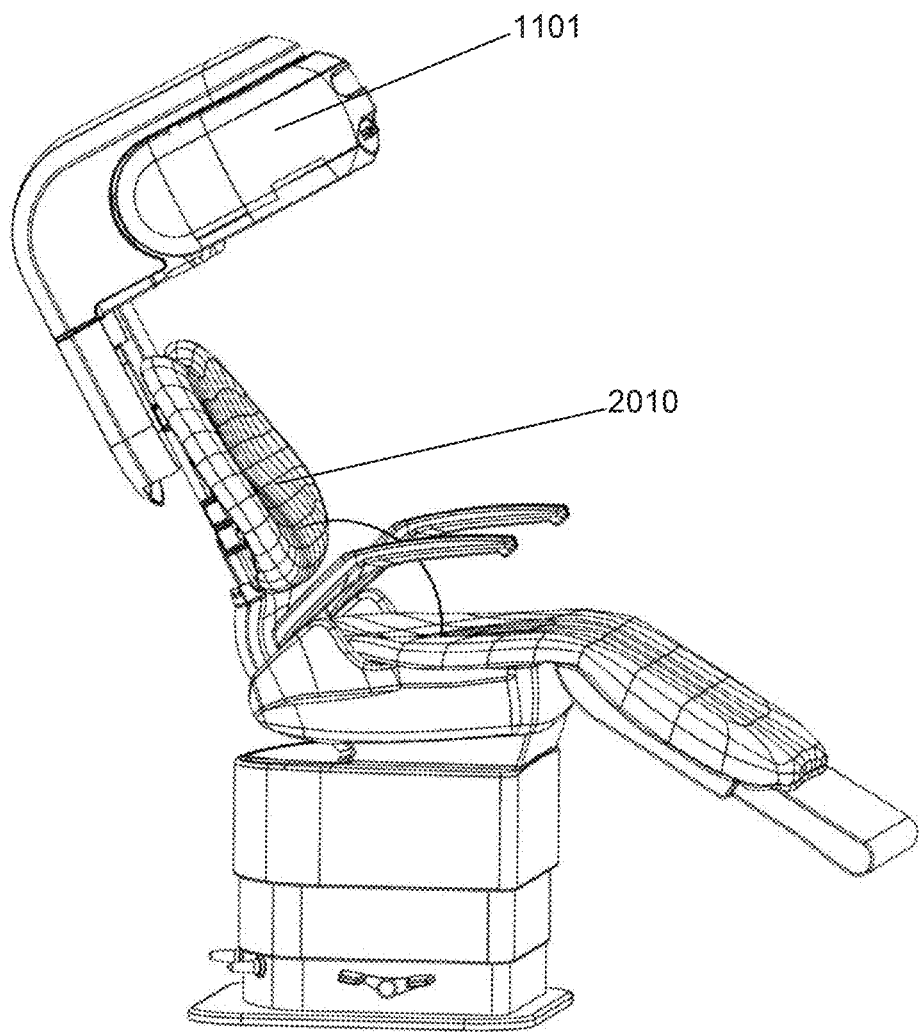
FIG. 21 illustrates a second view of the helmet attached to a medical chair in accordance with various embodiments of the present technology.
Figure 22:
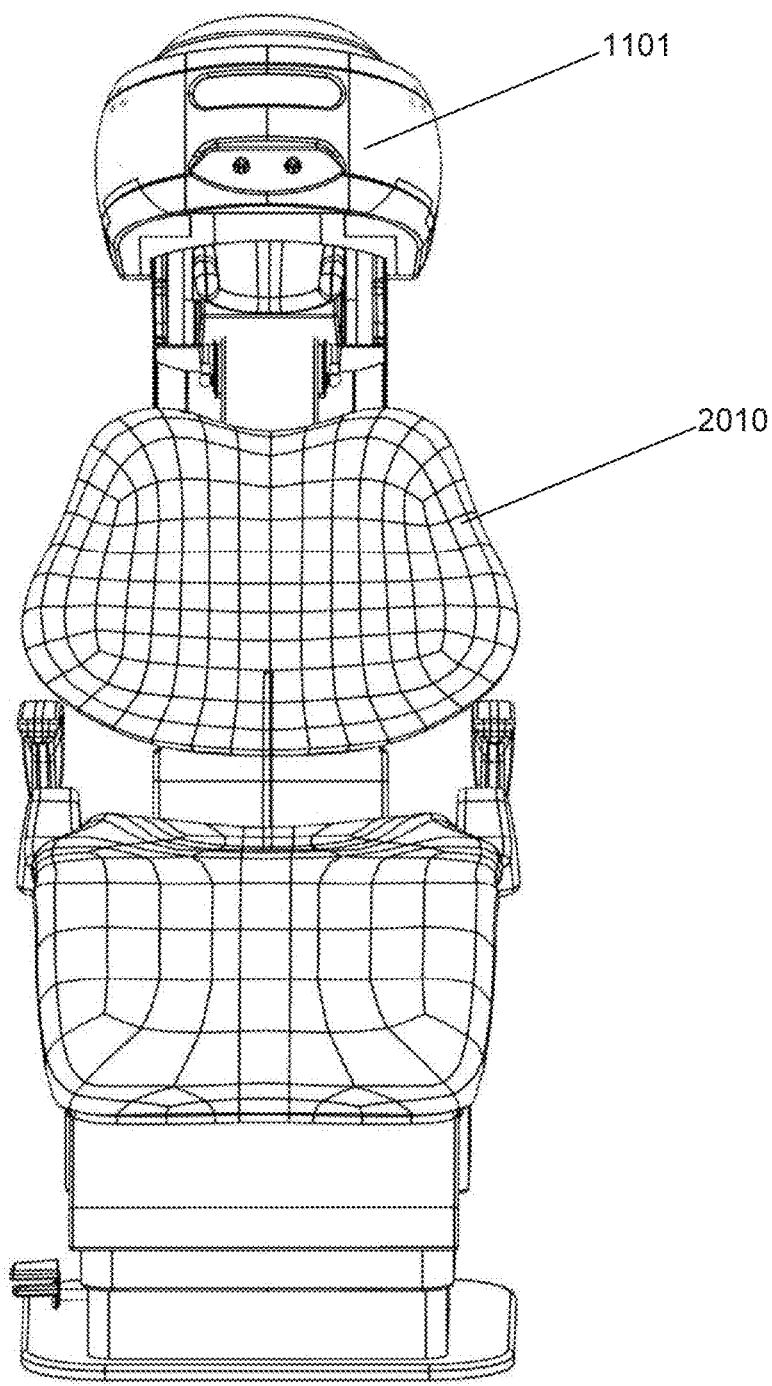
FIG. 22 illustrates a third view of the helmet attached to a medical chair in accordance with various embodiments of the present technology.

FIG. 20 illustrates the helmet 1101 attached to a medical chair 2010 in accordance with various embodiments of the present technology. FIG. 21 illustrates a second view of the helmet 1101 attached to the medical chair 2010 in accordance with various embodiments of the present technology. FIG. 22 illustrates a third view of the helmet 1101 attached to the medical chair 2010 in accordance with various embodiments of the present technology.

In the embodiments illustrated in FIGS. 20, 21 and 22, the helmet 1101 may be raised, lowered, and/or rotated in relation to the medical chair 2010. After an individual sits in the medical chair 2010, the helmet 1101 may be lowered and/or rotated so that the helmet 1101 covers all or a portion of the individual's head. The helmet 1101 may be positioned so that components of the apparatus 201 contained within the helmet 1101 are aligned with the individual's eyes.

Figure 23:
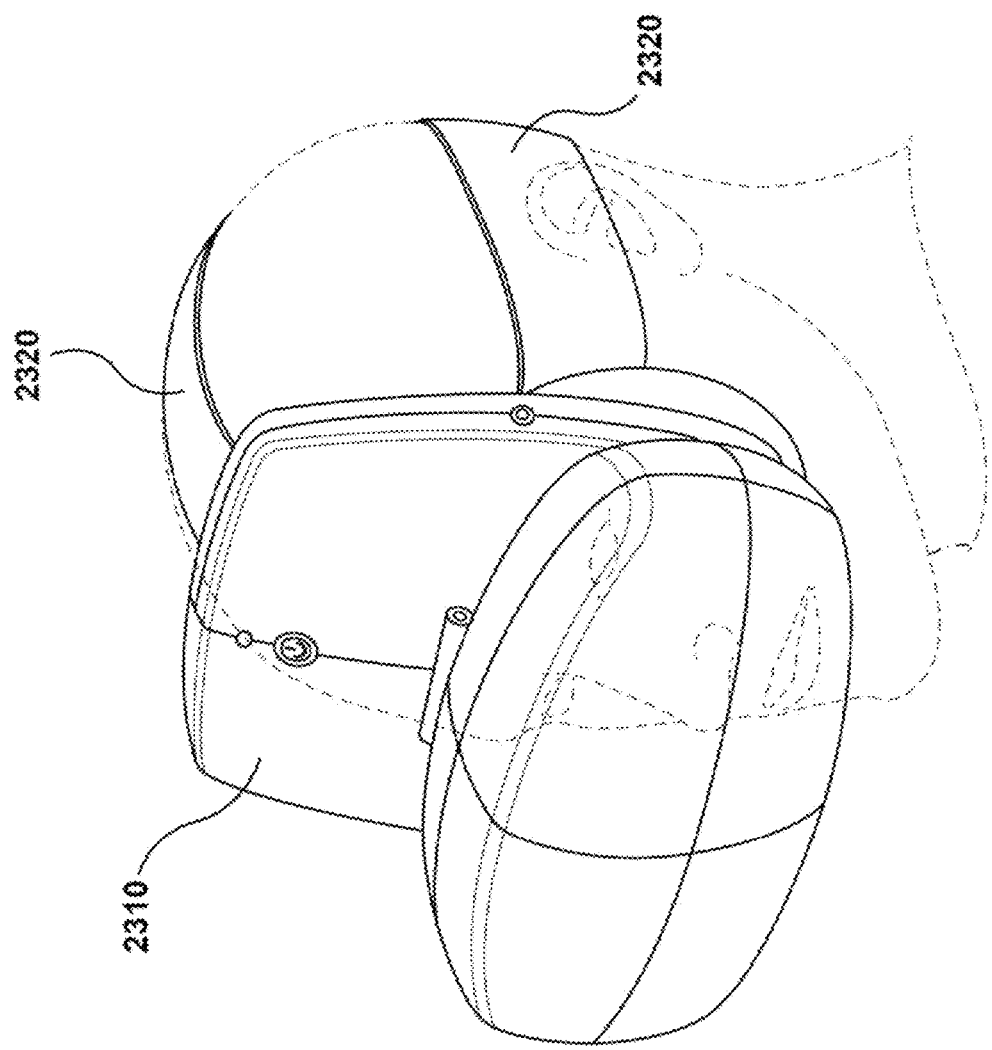
FIG. 23 illustrates goggles containing the apparatus for collecting retinal signal data in accordance with various embodiments of the present technology.

FIG. 23 illustrates goggles 2310 containing the apparatus for collecting retinal signal data in accordance with various embodiments of the present technology. The embodiment illustrated in FIG. 23 includes goggles 2310 and straps 2320 that secure the goggles 2310 to the individual's head. The goggles 2310 may contain the retinal signal data collection apparatus 201 and/or elements of the retinal signal data collection apparatus 201. The goggles 2310 may be used to collect retinal signal data when worn by an individual.

Figure 24:
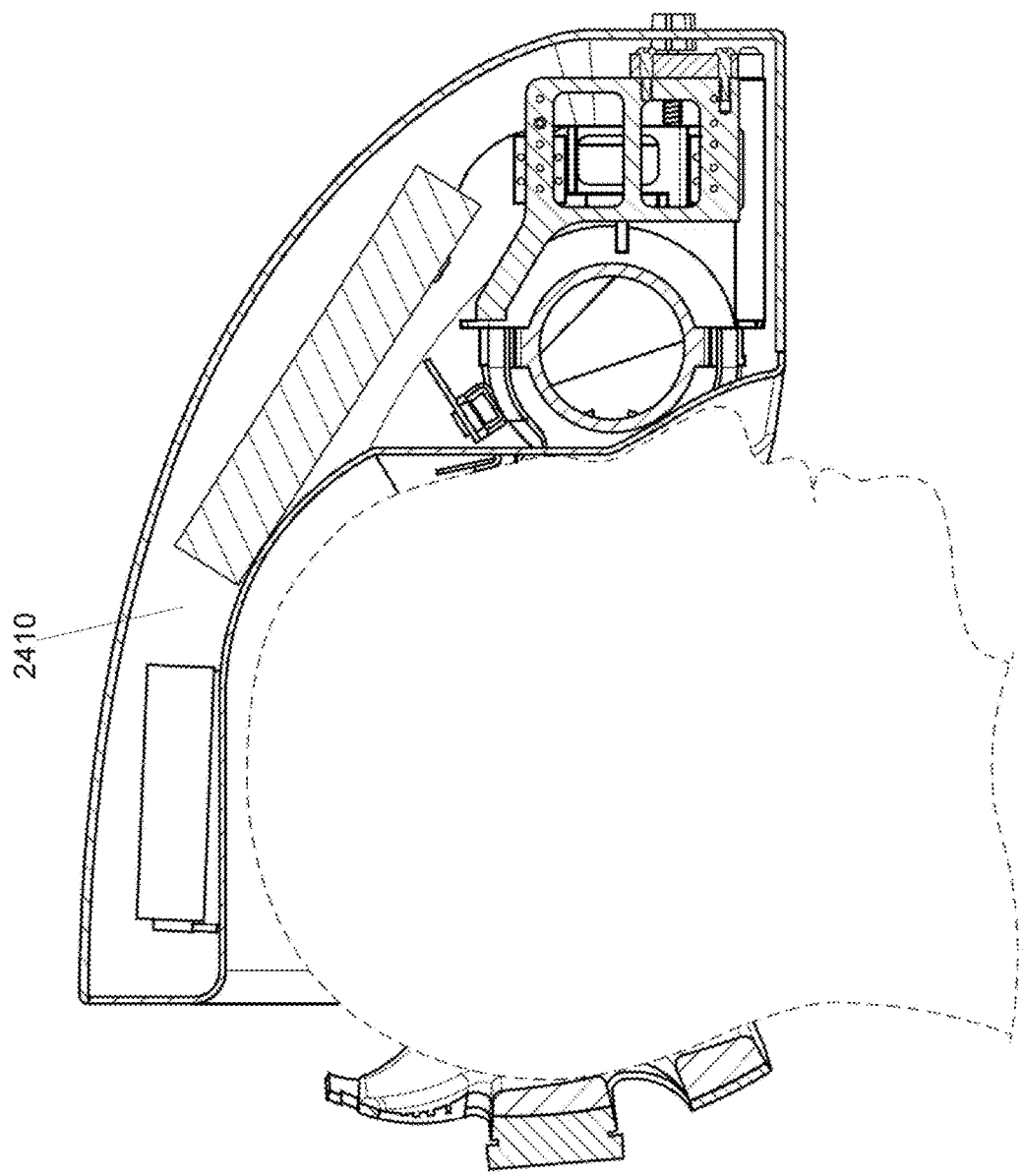
FIG. 24 illustrates a head-worn device containing the apparatus for collecting retinal signal data in accordance with various embodiments of the present technology.

FIG. 24 illustrates a head-worn device 2410 containing the apparatus for collecting retinal signal data in accordance with various embodiments of the present technology. The head-worn device 2410 may contain the retinal signal data collection apparatus 201 and/or elements of the retinal signal data collection apparatus 201. The head-worn device 2410 may be used to collect retinal signal data when worn by an individual.

Electrode Placement

FIG. 25 is a diagram 2500 that illustrates an example of electrode placement on an individual in accordance with various embodiments of the present technology. Several electrodes may be used for collecting retinal signal data: active electrodes to record the signal as an electrical potential difference with respect to reference electrodes, and a ground electrode as the zero reference for the polarity of the signal. A ground electrode 2510 may be placed on the skin in the middle of the forehead. The ground electrode 2510 may serve as the zero reference for the positive or negative polarity of the electrical signals collected by reference electrodes 2520 and 2530 and/or active electrodes 2540 and 2550. The reference electrodes 2520 and 2530 and/or active electrodes 2540 and 2550 capture electrical signals emitted from the individual. A circuit may be formed using the ground electrode 2510, reference electrodes 2520 and 2530, and/or active electrodes 2540 and 2550. Various parameters of the circuit may be recorded, such as the current, voltage, impedance, and/or any other electrical parameters. The ground electrode 2510, reference electrodes 2520 and 2530, and active electrodes 2540 and 2550, may be any type of electrode, may have any shape, may be made of any suitable material, and/or may be any combination of different types of electrodes. For example, the ground electrode 2510 may be a first type of electrode and the reference electrodes 2520, 2530, or the active electrodes 2540 and 2550, may be a second type of electrode that is different from the first type of electrode.

It should be understood that the diagram 2500 is an example of one arrangement of electrodes on an individual, and that any number of electrodes may be used and/or the electrodes may be placed in any other suitable areas. For example, the ground electrode 2510 may be placed on the individual's wrist instead of the forehead.

Figure 26:
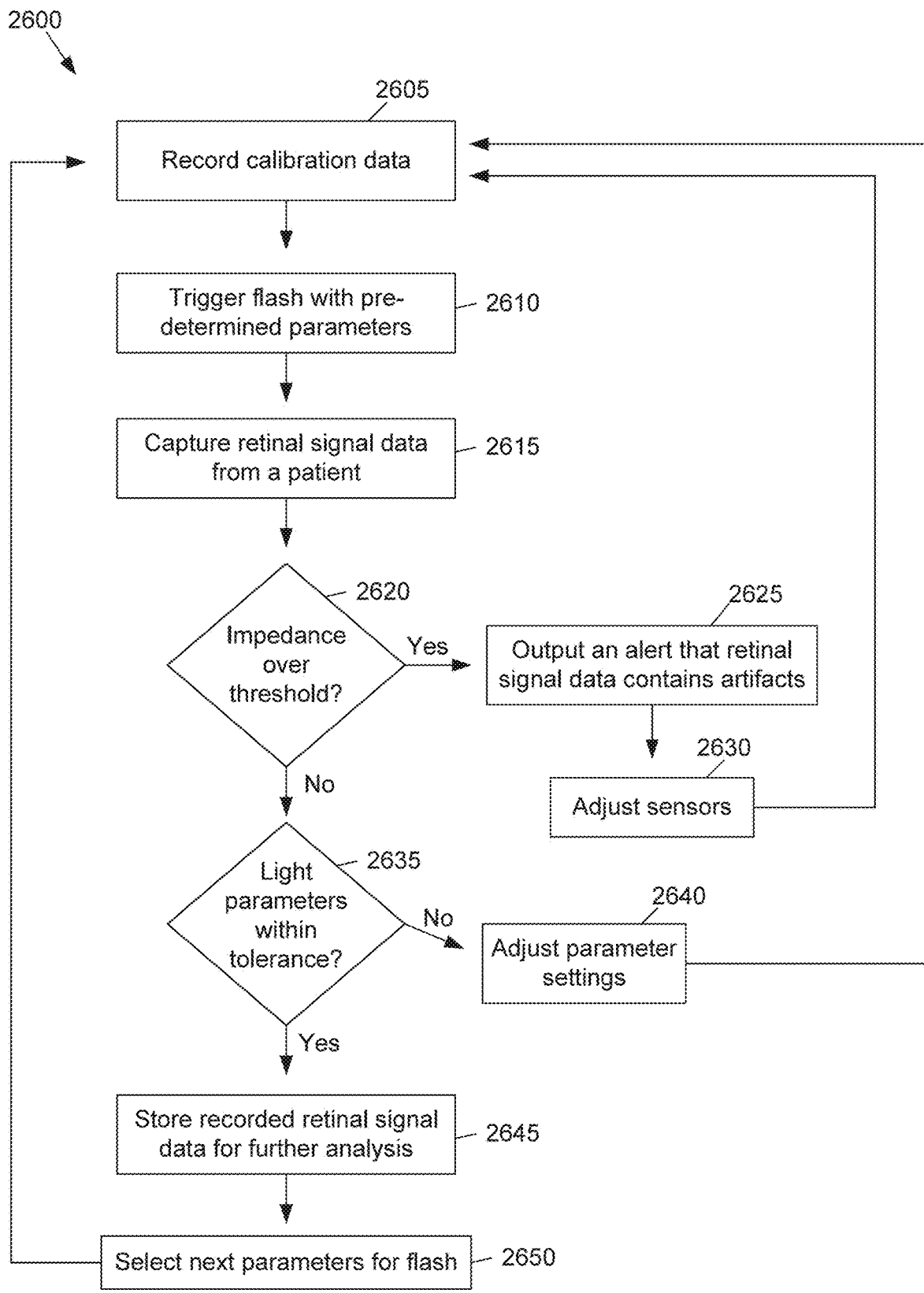
FIG. 26 is a flow diagram of a method for recording retinal signal data in accordance with various embodiments of the present technology.

Method for Collecting Retinal Signal Data Including Modulating the Light Emission Based on Spectrometer Data FIG. 26 is a flow diagram of a method 2600 for recording retinal signal data in accordance with various embodiments of the present technology. All or portions of the method 2600 may be executed by the retinal signal data collection apparatus 201, data collection system 215, data analysis system 220, and/or the data output system 225. In one or more aspects, the method 2600 or one or more steps thereof may be performed by a computing system, such as the computing environment 100. The method 2600 or one or more steps thereof may be embodied in computer-executable instructions that are stored in a computer-readable medium, such as a non-transitory mass storage device, loaded into memory and executed by a CPU. The method 2600 is exemplary, and it should be understood that some steps or portions of steps in the flow diagram may be omitted and/or changed in order.

At step 2605, calibration data may be recorded. Baseline and/or threshold parameters may be determined based on the calibration data. For example, a baseline and threshold impedance may be determined at step 2605. The calibration data may be collected during a pre-determined time period, such as 20 milliseconds. During the collection of the calibration data, the retina of the individual might not be stimulated by the light sources 202. In other words, the individual might not be exposed to any light stimulation during the recording of the calibration data. Electrical parameters and/or any other data may be collected at step 2605. The current, voltage, impedance, and/or any other electrical parameters may be collected. The spectrometers 203, photometer 209, and/or any other component of the retinal signal data collection apparatus 201 may record calibration data at step 2605, such as measuring background light levels.

Baseline parameters may be determined at step 2605, such as a baseline current, voltage, impedance, luminance, and/or any other parameters. The baseline parameters may be determined based on the calibration data. The baseline parameters may be a mean and/or a median of the parameters, and/or a function of those values, recorded in the calibration data. For example a baseline impedance may be determined as a mean of the impedance recorded in the calibration data, or as a time-function of the impedance values recorded in the calibration data. The baseline parameters may be used for all later measurements. For example an average voltage may be determined, and this average voltage may be subtracted from later measurements, such as those performed at step 2615. The baseline parameters may be recorded by the retinal signal data collection apparatus 201.

At step 2610, a flash of light may be triggered with pre-determined parameters. The parameters of the flash of light may include a luminance, a wavelength, the form of a light pulse, an illumination time, a background light wavelength, and/or a background light intensity. The flash of light may be emitted by the light sources 202. The flash of light may be reflected by the light reflectors 205 and directed towards the individual's eyes. The flash of light may stimulate the retina of the individual, which may cause electrical signals to be generated by the retina.

The pre-determined parameters for the flash of light may include a wavelength (e.g. from about 300 to about 800 nanometers), light intensity (e.g. from about 0.01 to about 3000 cd·s/m2), light pulse frequency (e.g. from about 0.001 Hz to 600 Hz), illumination time (e.g. from about 1 to about 500 milliseconds), time between light flashes (e.g. about 0.2 to about 50 seconds), different background light wavelength (e.g. from about 300 to about 800 nanometers), and/or background light intensity (e.g. about 0.01 to about 900 cd/m2).

At step 2615, retinal signal data may be captured from the individual. The retinal signal data may be collected by the retinal signal data collection apparatus 201, such as by the sensors 208, spectrometers 203, photometers 209, cameras 204, and/or controllers 207. The retinal signal data may include co-variables and parameters which may impact on the nature and the quality of the retinal signal data, such as the parameters of light stimulation measured by the spectrometers 203 and the impedance of the receiving electrical circuit used to collect the retinal signal data. The electrical circuit may be implemented in the retinal signal data collection apparatus 201. The retinal signal data may include measured electrical signals captured by electrodes placed on the individual. The retinal signal data may include the impedance of the receiving electrical circuit measuring the electrical signals.

The retinal signal data may comprise impedance measurements and/or other electrical parameters. The retinal signal data may comprise parameters such as eye position, pupil size, intensity of applied luminance, frequency of light stimulation, frequency of retinal signal sampling, wavelength of illumination, illumination time, background light wavelength, and/or background light intensity. The retinal signal data may comprise clinical information cofactors such as age, gender, iris pigmentation, retinal pigmentation, and/or skin pigmentation as a proxy for retinal pigmentation, etc. Therefore, in certain embodiments, the method 2600 comprises at step 2615, collecting impedance measurements.

The same set of parameters may be recorded at steps 2605 and 2615. The pre-determined parameters may be recorded along with the measured parameters. For example, the luminance that the light sources 202 were instructed to produce may be recorded, as well as the actual luminance of the flash of light measured by the spectrometers 203.

The retinal signal data may comprise electrical response data (e.g. voltage and circuit impedance) collected for several signal collection times (e.g. 5 to 500 milliseconds) at several sampling frequencies (e.g. 0.2 to 24 kHz) with the light stimulation synchronisation time (time of flash) and offset (baseline voltage and impedance prior to light stimulation). Therefore, step 2615 may comprise collecting retinal signal data at frequencies of 4 to 16 kHz.

The baseline parameters may also be used as the offset for the current, voltage, and/or any other electrical parameters. For example, the voltage and/or current may be normalized based on the baseline voltage and/or baseline current.

The retinal signal data may include data indicating eye movements, pupil size, pupil area, angle that light reaches the individual's retinas, light start time, light intensity, light spectrum, light chromaticity, and/or temporal cohesion between light stimulation and the electrical signals.

At step 2620, the collected retinal signal data may be compared to the threshold impedance determined at step 2605 based on the calibration data. The retinal signal data may be determined to contain artifacts and/or be likely to contain artifacts if the retinal signal data collected at step 2615 was above the threshold at any time. The impedance of the circuit collecting the retinal signal data may be compared to the threshold impedance. If the impedance of the circuit collecting the retinal signal data was above the threshold at any time, the retinal signal data may be determined to contain artifacts. The impedance may have been measured by the retinal signal data acquisition circuit 402.

Distorted signals may include spikes or other unusual features. Artifacts in electrical signals recorded from any electrode placed on the tissues of an individual may have a direct impact on amplitude, impedance, admittance, and/or conductance (the ability for electrical charges to flow in a certain path) of the circuit that the electrode is part of. These artifacts may be detected by analysing the time-course of the retinal signal data and locating the changes in amplitude, impedance, admittance, and/or conductance that may indicate artifacts. The retinal signal data may be determined to be likely to contain artifacts based an amount of change of the impedance of the circuit and/or a rate of change of the impedance.

The retinal signal data may be compared to pre-determined criteria or patterns to determine whether artifacts exist in the retinal signal data. For example, sudden changes in slope and/or baseline and/or high variations in amplitude and/or impedance in a very short period of time may be identified as indicative of artifacts. The rate of change of parameters of the retinal signal data may be analyzed to determine whether artifacts are present, such as the rate of change of impedance. The artifacts may be in the recorded electrical signals of the retinal signal data and/or any other type of data contained within the retinal signal data.

The impedance in the collected retinal signal data may be compared to the baseline impedance determined using the calibration data recorded at step 2605. A threshold impedance may be determined based on the calibration data. For example the threshold impedance may be ten percent higher than the baseline impedance determined at step 2605. If the impedance of the retinal signal data is above the threshold at any time, the retinal signal data may be determined to contain artifacts. A time period corresponding to the impedance being above the threshold may be determined. The retinal signal data recorded during that time period may be labeled as containing artifacts and/or the retinal signal data corresponding to that time period may be deleted.

Although step 2620 describes comparing the impedance to the threshold impedance, any other indicator of the circuit's dynamic resistance may be used. For example a threshold admittance and/or a threshold susceptance may be determined. The admittance and/or susceptance of the circuit collecting the retinal signal data collected at step 2615 may be compared to the threshold admittance and/or threshold susceptance. If the admittance and/or susceptance is above the threshold at any time, then the collected retinal signal data may be determined to contain artifacts at step 2620.

The artifact detection may be performed while the retinal signal data is being collected, such as in real-time or near real-time. The retinal signal data may be continuously monitored and/or monitored at pre-determined time periods. All or a portion of the retinal signal data may be monitored to determine whether there are any artifacts in the data. The artifacts may appear in the data regarding electrical signals in the retinal signal data, such as the amplitude of the current and/or voltage of the collected electrical signals.

The retinal signal data may be compared to pre-determined criteria or patterns to determine whether artifacts exist in the retinal signal data. For example, sudden changes in slope and/or baseline and/or high variations in amplitude and/or impedance in a very short period of time may be identified as indicative of artifacts. The artifacts may be in the recorded electrical signals of the retinal signal data and/or any other type of data contained within the retinal signal data.

If the impedance surpasses the threshold impedance and/or artifacts are detected using any other technique, the method 2600 may continue at step 2625. At step 2625, an alert may be output that artifacts have been detected. The alert may be issued after one or more artifacts have been detected in the retinal signal data. The alert may be issued when the impedance is above the threshold impedance. For example an alert may be output if an electrode were to change location or move during the recording. Any drift due to e.g. eye movement or eye blinks may cause an alert to be output. The eye movements, eye blinks, and/or any other information related to the patient's eyes may be detected by the cameras 204. The alert may be issued after artifacts have been detected for a threshold time period, such as two seconds. The alert may indicate which sensor is causing the artifacts. An alert may be output based on a sudden change in slope and/or baseline and/or high variations in amplitude and/or impedance. The alert may be an audio alert and/or a visual alert.

At step 2630 an operator may adjust the retinal signal data collection apparatus 201 based on the alert, such as by adjusting the sensors 208. The operator may adjust one or more of the sensors 208, such as by repositioning an electrode, and/or any other part of the retinal signal data collection apparatus 201. The operator may be notified whether the adjustment succeeded in correcting the issue, such as by the notification being cleared. It should be understood that steps 2625 and 2630 are optional.

After step 2630, calibration data may be recorded again at step 2605 and the flash of light may be triggered again at step 2610 with the same parameters as the previous flash of light. The corresponding retinal signal data may be captured at step 2615 and at step 2620 the retinal signal data may be compared to the threshold impedance to determine whether the retinal signal data contains artifacts. If the retinal signal data does not surpass the threshold impedance, the method 2600 may continue to step 2635. Otherwise, if the retinal signal data again has artifacts, then the method 2600 may proceed to step 2625 and the same flash of light may be triggered again at step 2610.

At step 2635 the measured parameters of the flash of light may be compared to the pre-determined parameters of the flash of light. The measured parameters may have been measured by the spectrometers 203. A difference between the measured parameters of the flash of light and the intended parameters may be determined. A pre-determined tolerance may be defined, such as five percent. If the measured parameters are outside of the pre-determined tolerance, the method 2600 may proceed to step 2640. Otherwise, if the parameters of the flash of light are within the tolerance of the intended parameters, the method 2600 may proceed to step 2645.

At step 2640 the pre-determined parameters for the flash of light may be adjusted. The parameters may be adjusted to compensate for a difference between the desired parameters of the flash of light and the measured parameters. After adjusting the parameters, calibration data may be recorded at step 2605 and the flash of light may then be triggered at 2610 with the adjusted parameters.

Other changes to the retinal signal data collection system may be made at step 2640. For example if a component of the retinal signal data collection system is determined to be malfunctioning, that component may be replaced. An alert may be issued indicating the hardware malfunction, such as an alert indicating that an LED is not functioning.

At step 2645, the retinal signal data may be stored. The retinal signal data may be stored for further analysis, such as for predicting whether the individual is subject to a medical condition. The retinal signal data may include any of the data measured by the retinal signal data collection apparatus 201, including data measured by the spectrometers 203, cameras 204, and/or sensors 208. The retinal signal data may have been collected by the controllers 207. The retinal signal data may be stored with the pre-determined parameters of the flash of light that was triggered at step 2610.

At step 2650, a next set of parameters may be selected for the flash. A sequence of flash parameters may have been pre-determined, and the next set of parameters may be selected from the pre-determined sequence. If there are no more parameters to select, the method 2600 may end. Otherwise, the method 2600 may continue to step 2605 where calibration data may be recorded and then to step 2610 where the flash may be triggered with the selected parameters.

Rather than checking the impedance at step 2620 after each flash is triggered, the artifact detection may be performed after all flashes have been triggered or after a series of flashes have been triggered. Similarly, the light parameters may be checked at step 2635 after each flash of light and/or after multiple flashes have been triggered. For example a flash or a series of flashes for a first luminance may be triggered, and retinal signal data may be captured for each flash, and then the impedance of the retinal signal data may be compared to the threshold impedance for each flash to determine whether any of the retinal signal data may contain artifacts and/or the measured parameters of the flash of light may be compared to the intended parameters of the flash of light. Then, a flash or a series of flashes for a second luminance may be triggered. Prior to each flash or series of flashes, the calibration data may be collected and a threshold impedance may be determined for each individual flash.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

The invention claimed is:

1. An apparatus for retinal stimulation, the apparatus comprising a housing supporting:
    a first light source configured to expose a retina of a left eye of an individual to a first flash of light;
    a second light source configured to expose a retina of a right eye of the individual to a second flash of light;
    a first spectrometer configured to record a light spectrum and an intensity of the first flash of light from the first light source;
    a second spectrometer configured to record a light spectrum and an intensity of the second flash of light from the second light source;
    a first camera configured to capture image data of the left eye while exposed to the first flash of light; and
    a second camera configured to capture image data of the right eye while exposed to the second flash of light.

2. The apparatus of claim 1, further comprising one or more electrodes attachable to the individual and configured to collect electrical signals from the individual.

3. The apparatus of claim 1, further comprising a light reflector configured to direct light from the first light source or the second light source towards the eye of the individual.

4. The apparatus of claim 1, further comprising a battery for providing power to one or more of: the first light source, the second light source, the first spectrometer, the second spectrometer, the first camera, and the second camera.

5. The apparatus of claim 1, wherein the first light source comprises a light emitting diode (LED).

6. The apparatus of claim 1, wherein the apparatus comprises an eye shade for enclosing the eye of the individual, and wherein the eye shade is configured to block external light from entering the eye of the individual.

7. The apparatus of claim 1, wherein the apparatus is a head-worn apparatus to be worn on a head of the individual.

8. The apparatus of claim 1, wherein the first light source and the second light source are configured to output the first flash of light and the second flash of light simultaneously.

9. The apparatus of claim 1, further comprising a controller communicatively coupled to the first light source and the first spectrometer, wherein the controller is configured to adjust a wavelength or an intensity of the first light source based on data from the first spectrometer.

10. The apparatus of claim 9, wherein the controller is configured to adjust a wavelength or intensity of the second light source based on data from the second spectrometer.

11. The apparatus of claim 1, further comprising a controller communicatively coupled to the first light source and the first camera, wherein the controller is configured to determine one or more of:
    a distance between the first camera and an iris of the left eye,
    a distance between the first light source and the iris of the left eye,
    a pupil size of the left eye,
    a pupil shape of the left eye, or
    an eye position of the left eye.

12. The apparatus of claim 1, further comprising a controller communicatively coupled to the second light source and the second camera, wherein the controller is configured to determine one or more of:
    a distance between the second camera and an iris of the right eye,
    a distance between the second light source and the iris of the right eye,
    a pupil size of the right eye, a pupil shape of the right eye, or
    an eye position of the right eye.

13. A system for collecting retinal signal data, the system comprising:
    one or more light sources configured to expose a retina of an eye of an individual to flashes of light;
    a spectrometer configured to record a light spectrum and an intensity of the flashes of light, wherein the system is configured to collect electrical signals produced by the retina of the individual in response to the flashes of light; and
    at least one processor and memory storing executable instructions which, when executed by the at least one processor, cause the system to:
        output, by the one or more light sources, a first flash of light at a selected wavelength and a selected intensity to the individual;
        receive, from the spectrometer, a measured wavelength and a measured intensity of the first flash of light;
        determine that the measured wavelength and the measured intensity is not within a pre-determined tolerance of the selected wavelength and the selected intensity;
        determine, based on a difference between the selected wavelength and the measured wavelength, and based on a difference between the selected intensity and the measured intensity, parameters for a second flash of light;
        cause the one or more light sources to output the second flash of light based on the parameters; and
        receive, from an electrode associated with the individual, retinal signal data of the individual responsive to the second flash of light.

14. The system of claim 13, wherein the retinal signal data comprises data from the spectrometer.

15. The system of claim 13, wherein the instructions further cause the system to:
    receive calibration data corresponding to the individual;
    determine, based on the calibration data, a threshold impedance of a circuit that collected the retinal signal data;
    determine that an impedance of the circuit has surpassed the threshold impedance; and after determining that the impedance of the circuit has surpassed the threshold impedance, re-record the retinal signal data.

16. The system of claim 13, further comprising a camera, and wherein the instructions further cause the system to determine, based on data from the camera, a pupil size and shape of the individual that was exposed to the second flash of light.

17. The system of claim 13, wherein the instructions further cause the system to receive, from the electrode, retinal signal data of the individual responsive to the first flash of light.

18. The system of claim 13, further comprising a camera, and wherein the instructions further cause the system to determine, based on data from the camera, a position of the eye of the individual.

19. The system of claim 13, further comprising a camera, and wherein the instructions further cause the system to determine, based on data from the camera, a shape of a pupil of the individual.

20. The system of claim 13, wherein the system comprises a plurality of electrodes, wherein the electrode associated with the individual is one of the plurality of electrodes, wherein the plurality of electrodes are attachable to the individual, and wherein the instructions that cause the system to receive the retinal signal data comprise instructions that cause the system to receive the retinal signal data from the plurality of electrodes.

* * * * *